United States Patent
Shah et al.

(10) Patent No.: US 10,692,259 B2
(45) Date of Patent: Jun. 23, 2020

(54) AUTOMATIC CREATION OF MEDIA COLLAGES

(71) Applicant: Adobe Inc., San Jose, CA (US)

(72) Inventors: Abhishek Shah, Delhi (IN); Sameer Bhatt, Noida (IN)

(73) Assignee: Adobe Inc., San Jose, CA (US)

( * ) Notice: Subject to any disclaimer, the term of this patent is extended or adjusted under 35 U.S.C. 154(b) by 373 days.

(21) Appl. No.: 15/380,456

(22) Filed: Dec. 15, 2016

(65) Prior Publication Data

US 2018/0174340 A1   Jun. 21, 2018

(51) Int. Cl.
*G06T 11/60* (2006.01)

(52) U.S. Cl.
CPC .................. *G06T 11/60* (2013.01)

(58) Field of Classification Search
None
See application file for complete search history.

(56) References Cited

U.S. PATENT DOCUMENTS

| | | | | |
|---|---|---|---|---|
| 9,361,720 B2 * | 6/2016 | Tang | | G06T 11/60 |
| 2009/0060373 A1 * | 3/2009 | Perera | | G06T 7/20 |
| | | | | 382/264 |
| 2011/0029635 A1 * | 2/2011 | Shkurko | | G06F 17/248 |
| | | | | 709/217 |
| 2013/0262482 A1 * | 10/2013 | Bogart | | G06F 16/50 |
| | | | | 707/751 |
| 2013/0294709 A1 * | 11/2013 | Bogart | | G06T 7/00 |
| | | | | 382/284 |
| 2015/0049093 A1 * | 2/2015 | Doll | | G06T 13/80 |
| | | | | 345/473 |
| 2015/0213635 A1 * | 7/2015 | Tang | | G06T 11/60 |
| | | | | 382/173 |
| 2015/0379748 A1 * | 12/2015 | Kumazaki | | G06T 11/60 |
| | | | | 382/284 |
| 2016/0212370 A1 * | 7/2016 | Lee | | H04N 5/44591 |
| 2017/0039746 A1 * | 2/2017 | Mizoguchi | | G06K 9/00268 |
| 2017/0091154 A1 * | 3/2017 | Eppolito | | G06F 3/0484 |
| 2017/0091973 A1 * | 3/2017 | Lee | | G06F 3/04883 |
| 2017/0186201 A1 * | 6/2017 | Obayashi | | G06T 11/60 |

* cited by examiner

*Primary Examiner* — Bernard Krasnic
(74) *Attorney, Agent, or Firm* — SBMC

(57) ABSTRACT

Techniques for automatic creation of media collages are described. In one or more implementations, unwanted frames are identified and removed from items of media content. A media score is then determined for items of media content based on characteristics of an appearance of the items within a plurality of collage templates. A template score is determined for each collage template of the plurality of collage templates by combining the media scores for each media item of the plurality of media items included in a collage template. At least one of the plurality of collage templates is selected based on determined template scores. Then, at least one media collage is outputted based on the selected collage templates.

20 Claims, 13 Drawing Sheets

500
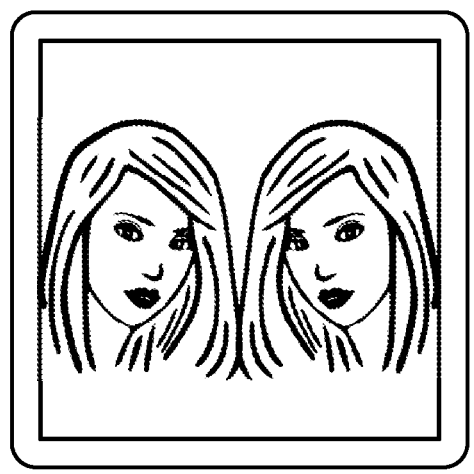
502
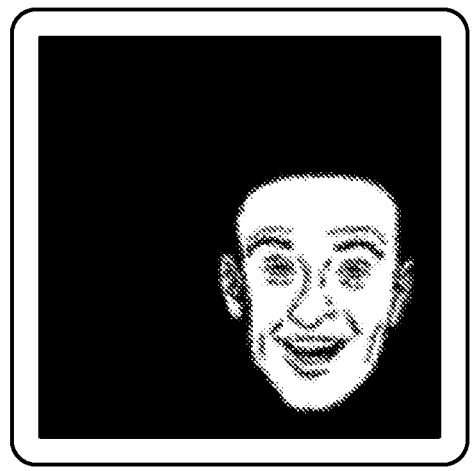
504
*Fig. 5*

900 —

902
Determine media scores for each of a plurality of items of media content based on characteristics of an appearance of each said item within a respective collage template of a plurality of collage templates

904
Determine a template score for each collage template of the plurality of collage templates by combining the media scores for each media item of the plurality of media items included in the respective said collage template

906
Select at least one of the plurality of collage templates based on the determined template scores for the plurality of collage templates

908
Output the media collage based on the selected at least one of the plurality of collage templates

Fig. 9

AUTOMATIC CREATION OF MEDIA COLLAGES

BACKGROUND

Cameras are becoming increasingly accessible and commonplace, allowing users to capture media content of aspects of everyday life. After capturing media content, such as videos, digital images, and so forth, users have numerous options for displaying this content. However, many of these options require a significant amount of a user's time in order to create aesthetically pleasing presentations of the user's media content for display. For example, it may take several iterations to select a digital image that fits within an atypically-shaped frame without obfuscating some feature in the image that the user feels is important.

In another example, with the current techniques, a user is subject to several steps to manually create a media collage containing video. First, the user must select from among items of media content that is accessible to the user, and must select from available collage templates to display the media collage. Both the number of items of media content and the number of collage templates can be in the dozens, hundreds, or even thousands of options. Once the user has selected an item of media content and a collage template, the user then fits the selected item of media content into a cell of the collage template. The user then previews the media collage at this stage to determine whether the video content clips outside of its cell, whether the video has been placed in the desired cell of the collage template, whether the video contains black (or unwanted, uniform color) frames, whether a pause frame of the video contains a desired image, and whether the video has a sufficient amount of interesting content, to name some examples. For each item of media content added to the media collage, the fitting to the cell and previewing must be repeated, which is both time-consuming and frustrating for users.

SUMMARY

Techniques for automatic creation of media collages are described. These techniques are usable to reduce frustration that users have with the growing number and variability of display options for media content. In a first example, unwanted frames are identified by a computing device and removed from items of media content. Unwanted frames can be removed by the computing device based on a determination of whether frames have content that is likely of interest to a user. Removal of unwanted frames by the computing device results in media content items that are more polished and refined for display. Once unwanted frames are removed, a media score is determined by the computing device for items of media content based on characteristics of how the items appear within a plurality of collage templates. The media scores indicate how well a particular item of media content appears within a cell of a collage template, and how well the particular item appears with combinations of other items of media content in the collage template. A template score is then determined by the computing device for each collage template by combining the media scores for each media item included in a collage template. The template scores are used by the computing device to determine one or more of the most aesthetically pleasing combinations of items of media content within respective collage templates. At least one of the plurality of collage templates is selected by the computing device based on determined template scores. Then, at least one media collage is output by the computing device based on the selected collage templates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a diagram depicting a paused frame characteristic that may be used in selecting items of media content for a media collage in accordance with one or more implementations.

FIG. 9 is a flow diagram that describes details in an example procedure which includes automatic creation of media collages in accordance with one or more implementations.

DETAILED DESCRIPTION

Overview

Figure 1:
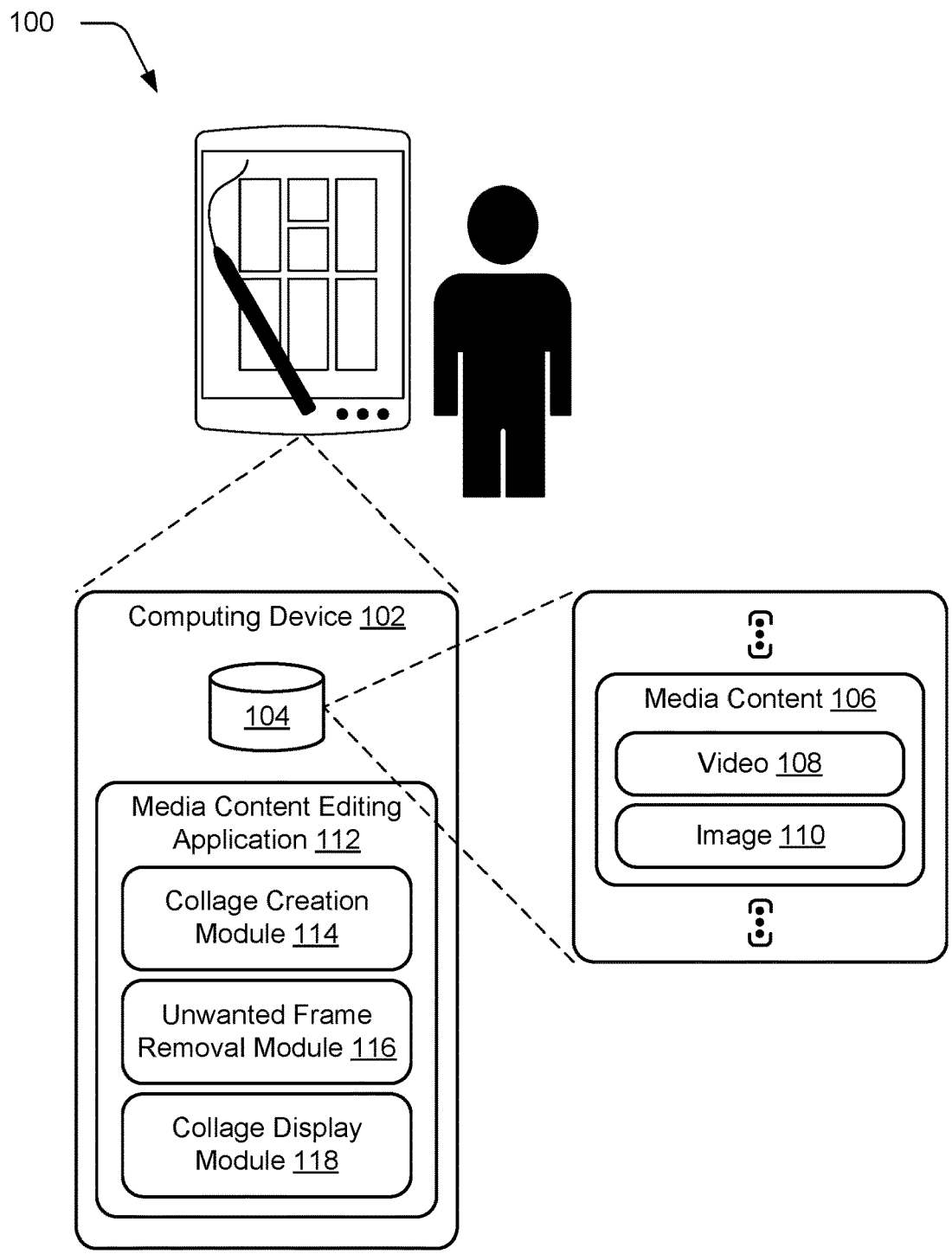
FIG. 1 illustrates an example operating environment in accordance with one or more implementations.

Techniques described herein provide solutions to problems faced by users when creating media collages. In one or more implementations, a computing device identifies and removes unwanted frames in media content items such as videos. Unwanted frames typically do not comprise any content that is of interest to a user. For instance, unwanted frames may have a variety of characteristics that interfere with consumption of desired frames within the media content. Unwanted frames, for example, may not include sound or may lack desired content, such as "filler" frames of a video that are uniform in color, such as black, blue, and so forth.

In one example of removal of unwanted frames, the computing device first selects a first frame of the video and checks each pixel of the first frame to determine if the pixels are generally uniform in color, such as black. Checking all (or a majority) of the pixels in the first frame gives the computing device a reliable indication of whether the first frame is a generally uniform color, so that the computing device can continue checking subsequent frames with more efficient techniques. If the first frame is a generally uniform color, then the computing device skips a number of frames to arrive at a second frame of the video. The computing device divides the second frame into subsections, and selects one point from each of the subsections. If any of the points selected in the second frame are not the uniform color, then the computing device checks all of the pixels of each skipped frame to determine which of the skipped frames are comprised entirely of the uniform color. Frames that are comprised entirely of the uniform color are removed from the video by the computing device.

However, if the computing device determines that the points selected in the second frame all the uniform color, then the computing device skips another group of frames to arrive at a third frame of the video. The computing device increments a location of the selected points to change the location of the selected points within the subsections. If any of the points at the incremented locations in the third frame are not the uniform color, then the computing device checks all of the pixels of each skipped frame (including the skipped frames between the first frame and the second frame) to determine if any of the skipped frames are not the uniform color. If any of the skipped frames are not the uniform color, the computing device removes the frames that are entirely the uniform color from the video.

Otherwise, the computing device continues to skip frames, increment the location of the selected point of each subsection in a frame, and determine if any of the selected points are the uniform color until a selected point is found that is not the uniform color. Once the computing device finds a selected point that is not the uniform color, the computing device checks all pixels of each skipped frame to determine if any of the skipped frames are not the uniform color. Frames that are entirely the uniform color are removed from the video by the computing device. Skipping frames and checking only if the selected points are the uniform color provides significant increases in efficiency when removing unwanted frames from items of media content. These increases in efficiency include reducing the amount of processing power to identify and remove the unwanted frames, and removing the unwanted frames in less time than previous techniques. Rather than checking each pixel of every frame as in previous techniques, the processes described herein for removing unwanted frames narrows down the possible frames that may lack content for faster and more effective unwanted frame removal.

Once the computing device removes unwanted frames from the items of media content, the computing device can create a media collage that comprises multiple items of media content. To create the media collage, the computing device may use an equation or algorithm that determines aesthetically pleasing combinations of media content items within different collage templates. The equation or algorithm may be comprised of multiple weighted relevance factors that represent characteristics of each media content item which are used to compute a media score for each media content item. A relevance factor is a numeric representation of a characteristic whose value is based on how well the characteristic of a particular item of media content compares to an ideal standard for the characteristic. A media score, generated by the computing device using the equation or algorithm, is based on the characteristics of the appearance of each item of media content within a particular collage template.

One characteristic may be a duration of each media content item and how the duration compares to other media content items, or whether the media content item has a minimum duration that may be able to accommodate entry or exit animations in a cell of the collage template. Additional characteristics may be related to a "pause frame" of the item of media content. Generally, a pause frame is a frame of a video that is selected to be displayed for an amount of time, such as while other videos continue to play in the media collage. In many cases, a pause frame is selected by the computing device because it is representative of aspects of a video's content. One characteristic of a pause frame may be a number or identity of faces present in a pause frame. Another characteristic of a pause frame may be whether the pause frame is of low quality (i.e., out of focus, insufficient lighting, etc.). Further, a pause frame may have characteristics related to whether there is audio at or near the pause frame in the video, and the volume of any audio at or near the pause frame in the video.

Another characteristic of the item of media content may be a number or percentage of interesting frames of a video. Interesting frames may be determined by the computing device based on a number of faces in a frame, how close objects are to the camera, or a velocity of objects in a video, to name some examples. An additional characteristic of the item of media content may be metadata associated with the items of media content, and how to group items of content together that have similar metadata. In an example, items of media content taken from a same camera, within a particular time range an at approximately the same location, may be placed in a cell of a collage template together such that the cumulative time of the videos in the cell matches the time of other videos in other cells of the collage template. Finally, a characteristic relating to aspects of the items of media content, such as time, place, or identity of persons or objects in the items of media content, may be used in the algorithm or equation.

The computing device generates a template score for each collage template and each combination of items of media content within each collage template. The computing device determines the template score by combining the media scores for each media content item included in a particular collage template. As mentioned above, relevance factors representing the characteristics may be weighted by the computing device, giving particular characteristics more importance in the selection of items of media content for a media collage. In one or more implementations, the computing device can output a media collage having the items of media content arranged in the collage template that resulted in the highest template score.

In the discussion that follows, a section titled "Operating Environment" is provided that describes one example environment in which one or more implementations can be employed. Then, a section titled "Automatic Creation of Media Collages" describes example details and procedures in accordance with one or more implementations. Next, a section titled "Removing Unwanted Frames from Items of Media Content" describes example details and procedures in accordance with one or more implementations. Last, a section titled "Example System" describes example computing systems, components, and devices that can be utilized for one or more implementations for predicting outcomes from a set of data.

TERM EXAMPLES

"Media content" is digital content that may be captured or created by a user. Examples of media content include digital images, videos, animations, and audio.

"Frames" are electronically coded still images used in video technology. Multiple frames ordered sequentially form a video. Frames are comprised of a number of pixels, which may vary in color to create an image in the frame.

"Media collage" is a compilation of multiple items of media content within a specified collage template. The items of media content may comprise images, video, text, audio, or other types of media content.

"Collage template" is a vacant layout arrangement comprising one or more cells that can be filled with items of media content to create a media collage.

"Characteristics" refer to different aspects of a particular item of media content. Characteristics may include visually identifiable properties, such as a number of faces in an image, may include auditory properties such as a level of audio at a particular frame of a video, or may relate to identifications made in metadata associated with an item of media content, for example.

"Relevance factors" are numeric representations of characteristics whose values are based on how well a characteristic of a particular item of media content compares to an ideal standard for the characteristic. For example, an ideal standard for a characteristic may be to match the durations of two videos as closely as possible. Accordingly, relevance factors may be assigned to a video based on how closely the video matches the durations of other videos.

"Media scores" are based on the characteristics of the appearance of each item of media content within a particular collage template. A media score may include weighted relevance factors that represent characteristics of the item of media content as the item of media content appears in a particular collage template.

"Template scores" are determined by combining all media scores for each media content item included in a single arrangement within a particular collage template. The particular collage template may receive more than one template score, as multiple media content items may be rearranged within the particular collage template with each arrangement receiving its own template score.

Operating Environment

FIG. 1 illustrates an operating environment generally at 100 in accordance with one or more implementations for automatic creation of media collages. The operating environment includes a computing device 102 that may include a processing system having one or more processors and devices (e.g., CPUs, GPUs, microcontrollers, hardware elements, fixed logic devices, etc.), and one or more computer-readable media. The various applications and modules 112-120, along with the storage 104, are included on the computing device 102 and may reside on the computer-readable media to be executed by the processing system. Examples of processing systems and computer-readable media can be found in the discussion of the example computing system of FIG. 11.

The processing system of the computing device 102 may retrieve and execute computer-program instructions from the application and modules 112-120, and other applications of the computing device (not pictured) to provide a wide range of functionality to the computing device 102, including but not limited to gaming, office productivity, email, media management, printing, networking, web-browsing, and so forth. A variety of data and program files related to the applications can also be included, examples of which include games files, office documents, multimedia files, emails, data files, web pages, user profile and/or preference data, and so forth.

The computing device 102 may include a storage element 104, which is configured to store media content 106 such as one or more videos 108 and one or more digital images 110, i.e., "images." The media content 106 may be captured by a camera of the computing device 102, transferred from a camera external to the computing device 102, or obtained from a service provider system via a network (not pictured), to name a few examples. The media content 106 may also include other types of media, such as audio recordings and animations, for example.

The computing device 102 may also include a media content editing application 112. The media content editing application 112 may be provided using any suitable combination of hardware, software, firmware, and/or logic devices. The media content editing application 112 represents functionality operable to create and/or edit media content, including automatically creating media collages. Creating and editing media content may also include removing unwanted frames from video, editing digital images or video, stitching together multiple items of media content to form a single item of media content, and so on. The media content editing application 112 may comprise a part of one or more other applications, such as camera applications, social networking applications, applications for website design, or software development applications, for example. The various modules 114, 116, and 120 are configured to implement a number of functionalities of the computing device 102 for automatic creation of media collages. The collage creation module 114 represents functionality of the computing device 102 that is operable to automatically create media collages using one or more items of media content. A media collage is a compilation of multiple items of media content within a specified collage template. The items of media content may comprise images, video, text, audio, or other types of media content.

Current techniques require users to select multiple items of media from amongst dozens, hundreds, or even thousands of possible items of media content for a media collage. Further, there are numerous choices for collage templates for media collages, and as media collages become more popular, the number of collage template choices continues to grow. When creating a conventional media collage, users must consider, among other concerns, the items of media content, how the items of media content will fit within the collage template, if and how the items of media content relate to each other, and in the case of videos, different lengths of video in each cell of the collage template. The sheer volume of choices and optimizations that must take place to create an aesthetically pleasing media collage is overwhelming and frustrating for users when manually creating a media collage. Therefore, the collage creation module 114 utilizes automated rules and characterizations for selection of potential items of media content to be put into a collage template to create a media collage. The automated rules and characterizations optimize the creation of the media collage by removing the need for human selection of each of the items of media content for a media collage from among countless options.

Particularly, the collage creation module 114 utilizes a weighted equation or algorithm to automatically select aesthetically pleasing combinations of templates and items of media content to generate a media collage. In one or more implementations, the collage creation module 114 automatically creates a media collage after the unwanted frames are removed from items of media content by the unwanted frame removal module 116, discussed below. For a particular template and a set of items of media content 106 within the particular template, a media score is determined for each item of media content appearing in the particular template. The media score includes weighted relevance factors that represent characteristics of the item of media content as the item of media content appears in the particular template. As discussed above and below, a relevance factor is a numeric of a characteristic whose value is based on how well the characteristic of a particular item of media content compares to an ideal standard for the characteristic. For each template, a template score is generated that is a combined value of all of the media scores of the combinations of items of media content appearing in the particular template.

The characteristics can include duration of a video 108; faces or objects appearing in a pause frame of a video 108 or in an image 110; level of quality of a pause frame of a video 108, or level of quality of an image 110; a total number, or a percentage, of frames of a video 108 that are considered interesting based on a number of faces or objects in the frames; how metadata of a video 108 or image 110 corresponds to other items of media content, especially for selection of multiple items of media content to be placed in a same cell of a collage template; or whether aspects of the items of media content, such as persons or objects, appear in more than one item of media content. These characteristics are meant only as examples, and are not intended to limit the possibilities of characteristics that may be used to select items of media content for a media collage. The weights applied to the characteristics may be predefined by the collage creation module 114, or may be set by a user.

The collage creation module 114 repeats the determination of the media scores and template scores for all combinations of collage templates and items of media content 106. It should be understood that a subset of either the collage templates and/or the media content 106 may be selected from a larger collection for consideration when determining the media scores and template scores. For example, a user may wish to create a collage from a template having three cells, using items of media content saved in a folder titled "Trip to Germany." In this case, the user may select a subset of templates that only have three cells for displaying items of media content from a larger collection of templates that have one, two, four, or more cells. Further, the user may select the "Trip to Germany" folder to limit the options of items of media content that are used in determining the media scores for creating the media collage from a larger collection of items of media content.

The collage creation module 114 then selects one or more of the combinations of a template and items of media content 106 based on the template scores, and the collage display module 118 outputs the selected combinations to the user. In one or more implementations, only a single highest scoring combination of a template and items of media content 106 are output to the user by the collage display module 118. However, multiple top-scoring combinations may be output to the user, allowing the user to select which of the top-scoring combinations the user likes best and desires to keep for further use. The highest scoring combinations are output when a high template score represents a more aesthetically pleasing media collage. Alternatively or additionally, a lowest-scoring combination or combinations may be output to the user, such as when low scoring combinations represent more aesthetically pleasing media collages.

The unwanted frame removal module 116 represents functionality operable to remove unwanted frames from items of media content, such as videos. An unwanted frame may be a frame of a video that is a uniform color, such as an entirely black frame. While reference is made herein to unwanted frames being entirely black, any other color is contemplated such as entirely white frames or entirely blue frames, for example. These frames are considered "unwanted" because they typically do not comprise any content that a user desires to keep. Unwanted frames may be the result of a user beginning to film a video with his or her hand covering the lens, for example, causing the first several frames of the video to be black. Unwanted frames may also have little or no audio component, which may be used as an additional indicator that the frames should be removed. Removal of these unwanted frames results in smaller file sizes and therefore more data can be stored on the computing device 102.

To remove unwanted frames from a video, the unwanted frame removal module 116 selects a first frame of the video and checks each pixel of the frame to determine if the first frame is a uniform color, such as black. If the first frame is a uniform color, then the unwanted frame removal module 116 skips a number of frames to arrive at a second frame of the video. The unwanted frame removal module 116 divides the second frame into subsections, and one point is selected from each of the subsections for evaluation. If any of the points selected in the second frame are not the uniform color, then the unwanted frame removal module 116 checks all of the pixels of each skipped frame to determine which of the skipped frames are comprised entirely of the uniform color. The unwanted frame removal module 116 removes all frames that are comprised entirely of the uniform color from the video.

However, if the unwanted frame removal module 116 determines that the points selected in the second frame are all the uniform color, then another group of frames are skipped to arrive at a third frame of the video. The unwanted frame removal module 116 increments a location of the selected points to change the location of the selected points within the subsections. Incrementing the location of the selected points may include selecting a new location that is 'H' pixels in a horizontal direction and 'V' pixels in a vertical direction from the location of the points selected in the second frame of the video. If any of the selected points at the incremented locations in the third frame are not the uniform color, then the unwanted frame removal module 116 checks all of the pixels of each skipped frame (including the skipped frames between the first frame and the second frame) to determine if any of the skipped frames are not the uniform color. The unwanted frame removal module 116 removes frames that are entirely the uniform color from the video.

Otherwise, the unwanted frame removal module 116 repeats the process of skipping frames, incrementing the location of the selected point of each subsection in a frame, and determining if any of the selected points are the uniform color until a selected point is found that is not the uniform color. Once the unwanted frame removal module 116 finds a selected point that is not the uniform color, all pixels of each skipped frame are checked to determine if any of the skipped frames are not the uniform color. The unwanted frame removal module 116 then removes frames that are entirely the uniform color from the video.

Having described an example operating environment, consider now example details and techniques associated with one or more implementations of removing unwanted frames from items of media content.

Automatic Creation of Media Collages

As discussed above, techniques described herein may be used to automatically create media collages using one or more items of media content. With current techniques, it is very difficult for users to manually create media collages given the large number of items of media content to select from along with the large number of media collage templates to select from. These problems are aggravated when a media collage contains video, because the media collage is now dynamic. The user must take extra time and care with how a video is placed in a cell of a media collage template because objects of interest move throughout frames of the video. Further, the duration of the video must be coordinated with media in other cells of the media collage template, to name but a few difficulties.

For example, with the current techniques, the user is subject to several steps to manually create a media collage containing video. First, the user must select from among items of media content that is accessible to the user, and must select from available collage templates to display the media collage. As discussed above, both the number of items of media content and the number of collage templates can be in the dozens, hundreds, or even thousands of options. Once the user has selected an item of media content and a collage template, the user then fits the selected item of media content into a cell of the collage template. The user then previews the media collage at this stage to determine whether the video content clips outside of its cell, whether the video has been placed in the desired cell of the collage template, whether the video contains black (or unwanted, uniform color) frames, whether a pause frame of the video contains a desired image, and whether the video has a sufficient amount of interesting content, to name some examples. For each item of media content added to the media collage, the fitting to the cell and previewing must be repeated.

When any additional items of media content are added to the collage template in a simultaneous play setting, the user must also manually check whether the durations of all videos placed in the collage template are close enough to each other. When additional items of media content are added to the collage template in a play one-by-one setting, the user must check whether the videos are playing in the desired order. If any issues are found after previewing the media collage, the user must then either change the collage template, change one or more of the items of media content, or reorder the items of media content, and then repeat the previewing, checking, and changing as necessary until the user is satisfied with the media collage. This manual process is extremely tedious, time-consuming, and frustrating for users who want to create aesthetically pleasing media collages.

Figure 2:
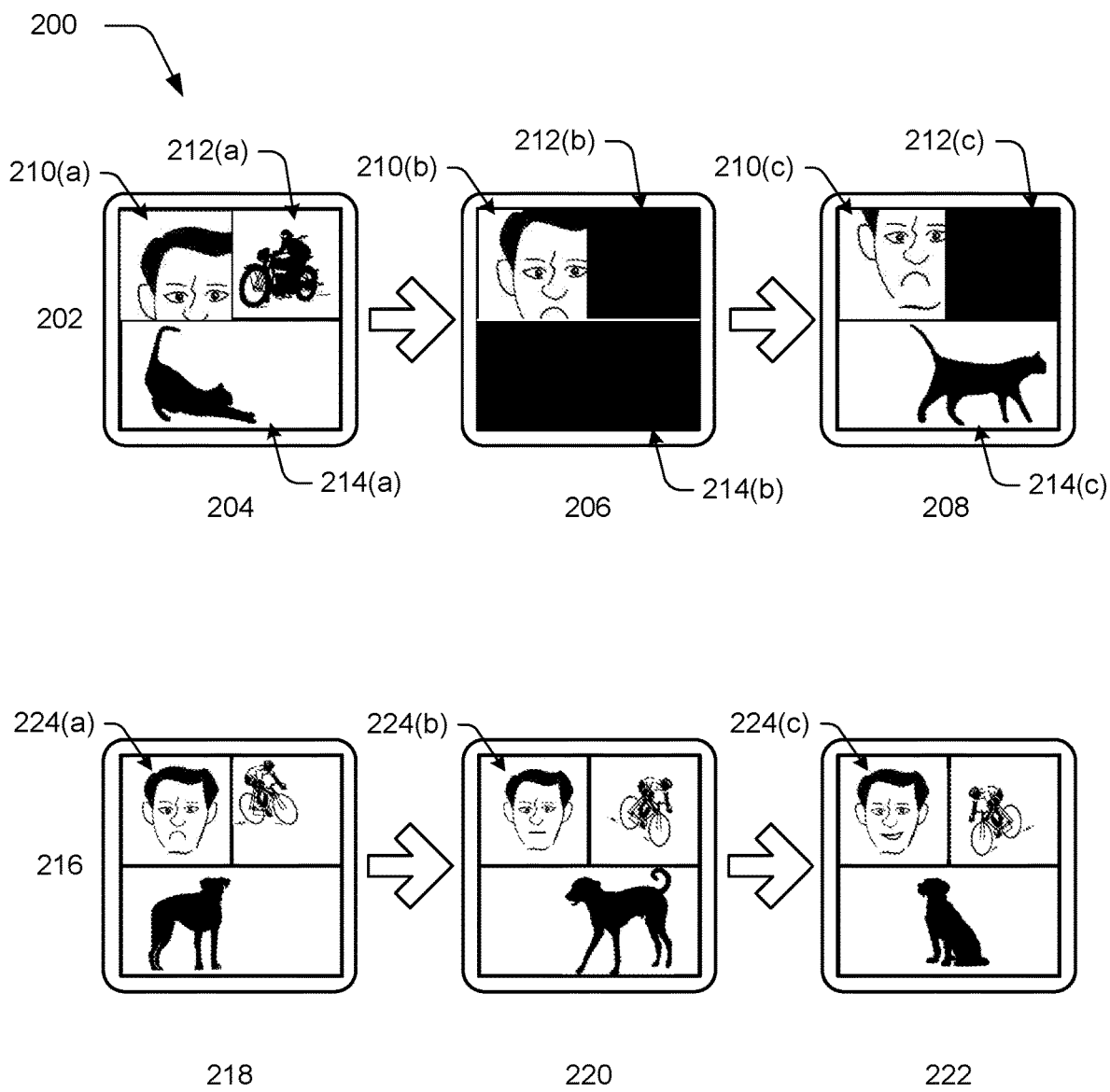
FIG. 2 illustrates two media collages generated using two different techniques in accordance with one or more implementations.

In contrast, the techniques described herein create aesthetically pleasing media collages automatically by applying a predefined set of rules to characteristics of items of media content and collage templates. FIG. 2 depicts two different media collages generally at 200, where a first of the media collages 202 is manually created by a user and a second of the media collages 216 is created automatically with the described techniques. The manually-created media collage 202 is depicted at three points in time 204, 206, and 208 respectively, and shows common problems that may arise with a manually-created video media collage. At a first point in time 204, the manually-created media collage 202 displays three videos. A first video is shown at 210(a), but it is apparent that the particular video is undesirable in the selected cell size for the particular collage template—significant portions of the man's head are out of view. While the man's head comes more into view at the second point in time 206 in the first video at 210(b), the man's head continues to go out of view at the third point in time 208 in the first video at 210(c). The first video shown at 210(a)-(c) may be better suited for a larger cell in a different collage template, or may need to be adjusted manually by the user so that the man's head fits better into the selected cell of the collage template, such as by zooming out.

At the first point in time 204, a second video is also shown at 212(a), and it appears that the object of the video (the motorcycle) fits reasonably within the selected cell of the collage template. However, moving to the second point in time 206, the second video shown at 212(b) has ended while the other videos in the manually-created collage template 202 continue to play. Similarly, at the third point in time 208, the second video shown at 212(c) has concluded while the other videos in the manually-created collage template 202 continue to play. The second video shown at 212(a)-(c) is not a duration that is suited for this particular media collage. The second video shown at 212(a)-(c) is much shorter than the other videos in the manually-created media collage 202, and results in a blank frame being displayed for an undesirable amount of time while the other videos in the manually-created media collage 202 finish.

Again at the first point in time 204, a third video is shown at 214(a), and again it appears that an object of the video (the cat) fits reasonably within the selected cell of the collage template. Moving to the second point in time 206, it appears that a duration of the video shown at 214(b) is made up of unwanted frames. These unwanted frames may be a result of a user accidentally placing a finger over a lens of a camera that captured the video, for example, resulting in the black frame shown at 214(b) followed by the cat returning to view shown at 214(c). Because the unwanted frames occur in the middle of the video, the user creating the media collage may not have any indication that they are present without previewing the entire video. These unwanted frames may need to be removed manually absent automatic removal techniques, which can take time away from creation of the media collage. Further, once the unwanted frames are removed, the duration of the video may be substantially different and result in the video no longer conforming to the other videos that the user desires to have in the media collage. These are but a few of the challenges faced by users manually creating media collages, and the resulting media collage may still not be aesthetically pleasing despite a great deal of time being spent on its creation.

On the other hand, automatic creation of media collages using weighted characteristics for each item of media content and collage template remedies the problems presented with manually-created media collages. For example, the automatically-created media collage 216 is depicted at three points in time 218, 220, and 222, respectively. Unlike the man in the video shown at 210(a)-(c), the face of the man in the video shown at 224(a)-(c) is within the cell from the first point in time 218, to the second point in time 220, through the third point in time 222. The video shown at 224(a)-(c)

may have been selected automatically at least in part because the object of interest in the video fit within the cell of the collage template.

In fact, each of the videos in the automatically-created media collage 216 was selected in part because of a particular aspect in each video. Furthermore, unlike the videos in the manually-created media collage 202, each of the videos in the automatically-created media collage 216 have a similar duration. In addition, the videos in the automatically-created media collage 216 either do not comprise unwanted frames, or any unwanted frames that were present in the videos were removed such as by the unwanted frame removal procedure discussed in relation to FIGS. 10-12. A number of characteristics of items of media content may be considered when automatically creating a media collage. Each characteristic may be assigned a numeric relevance factor, and these relevance factors may be weighted to place higher importance on particular characteristics for selection as part of a media collage. Several possible characteristics are discussed in relation to FIGS. 4-8.

Figure 3:
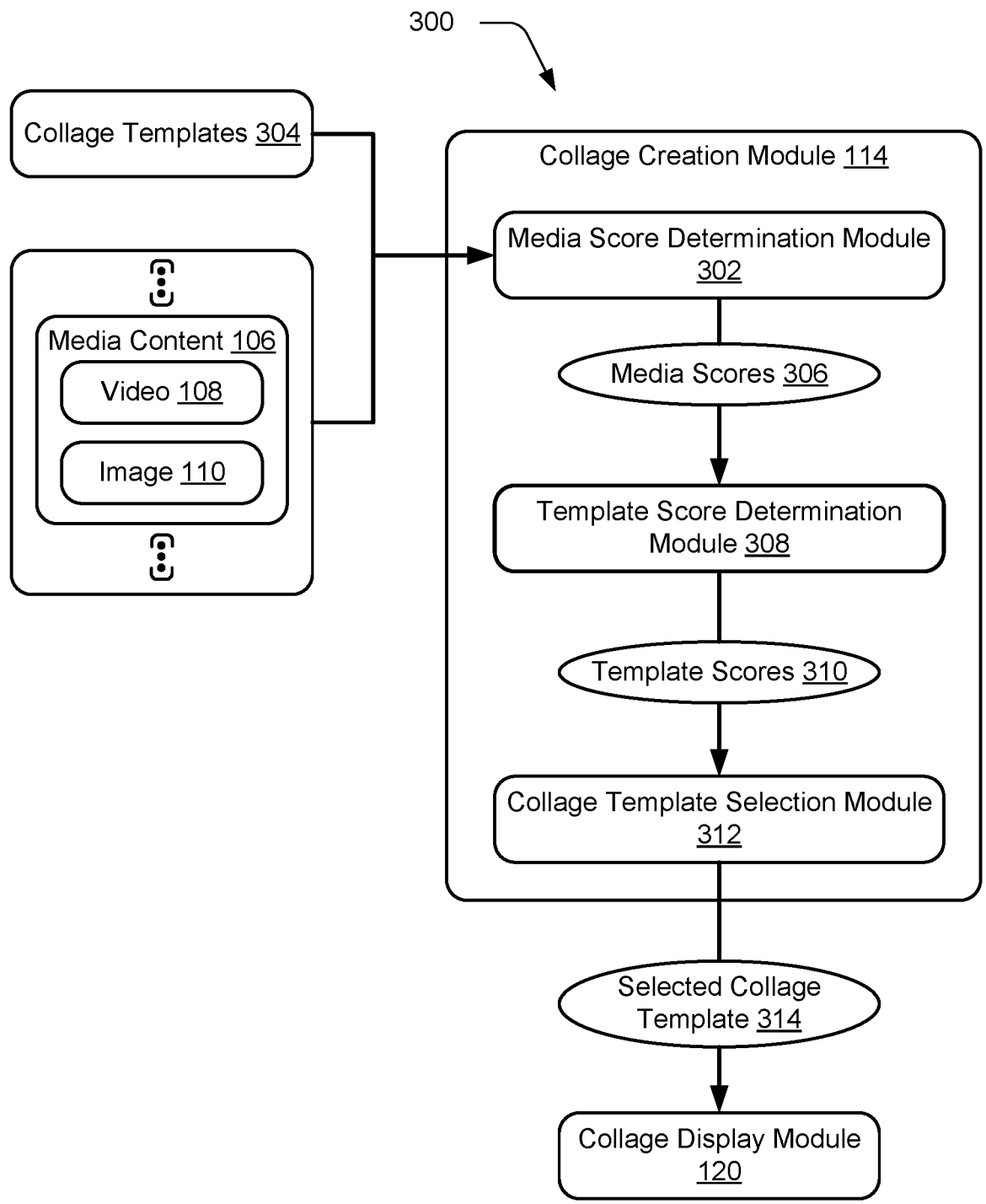
FIG. 3 illustrates additional details of a collage creation module in accordance with one or more implementations.

In order to implement the techniques described herein for automatically creating media collages, consider additional details of the collage creation module 114 depicted in FIG. 3, generally at 300. The collage creation module 114 may comprise a media score determination module 302 configured to determine media scores 306 for items of media content 106 in creating a media collage. The collage creation module 114 may also make use of collage templates 304 for automatic creation of media collages. Collage templates 304 are vacant layout arrangements comprising one or more cells that can be filled with items of media content to create a media collage. The collage templates 304 may be implemented as part of the collage creation module 114, may be part of another application of the computing device 102, or accessed from a remote source via a network (not pictured) to name some examples. The collage creation module 114 may use all of the collage templates 304 that are available in creating a media collage, or may use only a subset of the available collage templates 304 in creating a media collage, such as a subset of collage templates selected by a user.

The media score determination module 302 determines the media scores 306 based on characteristics of an appearance of each item of media content 106 within a respective collage template from the collage templates 304. As discussed above and below, the characteristics may be represented by relevance factors in an equation or algorithm that determines a score for each item of media content 106 within a respective collage template. Multiple scores can be determined for a single item of media content 106 to evaluate the appearance of the item of media content in each cell of all of the collage templates 304. The item of media content 106 may receive different scores based on the different placements within cells of different collage templates 304 and combinations with other items of media content that are used in the different collage templates 304.

In an example, a first video may be placed in a cell of a collage template having three cells. The first video will receive a media score 306 in the collage template with a first combination of two additional videos filling the other two cells in the collage template. The first video will receive another media score 306 in the same position of the collage template when the two additional videos switch cells in the collage template. The first video will also receive two more media scores 306 as the first video appears in each of the two other cells of the first collage template, so that each of the three videos appears in each of the three cells. For these three videos appearing in one collage template, the first video will receive six media scores 306. Similarly, the two additional videos will each receive six media scores 306 in the same scenario.

Once the media scores 306 are determined for all selected items of media content 106 and collage templates 304, the media scores 306 are passed to a template score determination module 308. The template score determination module 308 determines a template score 310 for each collage template of all of the selected collage templates 304. The template score determination module 308 determines the template scores 310 by combining the media scores 306 for each item of media content 106 included in a particular collage template. The media scores 306 may be combined in any suitable way, such as adding the media scores, multiplying the media scores, or applying a weighted average to the media scores, to name some examples.

The template scores 310 are sent to a collage template selection module 312 of the collage creation module 114. The collage template selection module 312 is configured to select at least one of the collage templates 304 including the items of media content 106 in selected cells of the collage templates 304 based on the determined template scores 310. This may include selecting one or more collage templates 304 and items of media content 106 that resulted in the highest combined template scores 310, or the lowest combined template scores 310. Other techniques of selecting one or more collage templates 304 including items of media content 106 based on the template scores 310 are also considered. Selected collage templates 314 are then sent to the collage display module 120 to be displayed or output as discussed above.

Having described techniques for automatically creating media collages in accordance with one or more implementations, consider now characteristics of items of media content that may be evaluated for media scores when automatically creating media collages. As discussed above, characteristics may be assigned numeric relevance factors, and these relevance factors may be weighted to place higher importance on particular characteristics for selection as part of a media collage. While the relevance factors are described with desired characteristics having higher relevance factor values below, it should be understood that in some scenarios lower relevance factor values may represent more desired characteristics. Following the description of the example characteristics, an example weighted equation is described that may be used by a computing device to determine media scores for automatically generating a media collage.

Video Duration Characteristics

Figure 4:
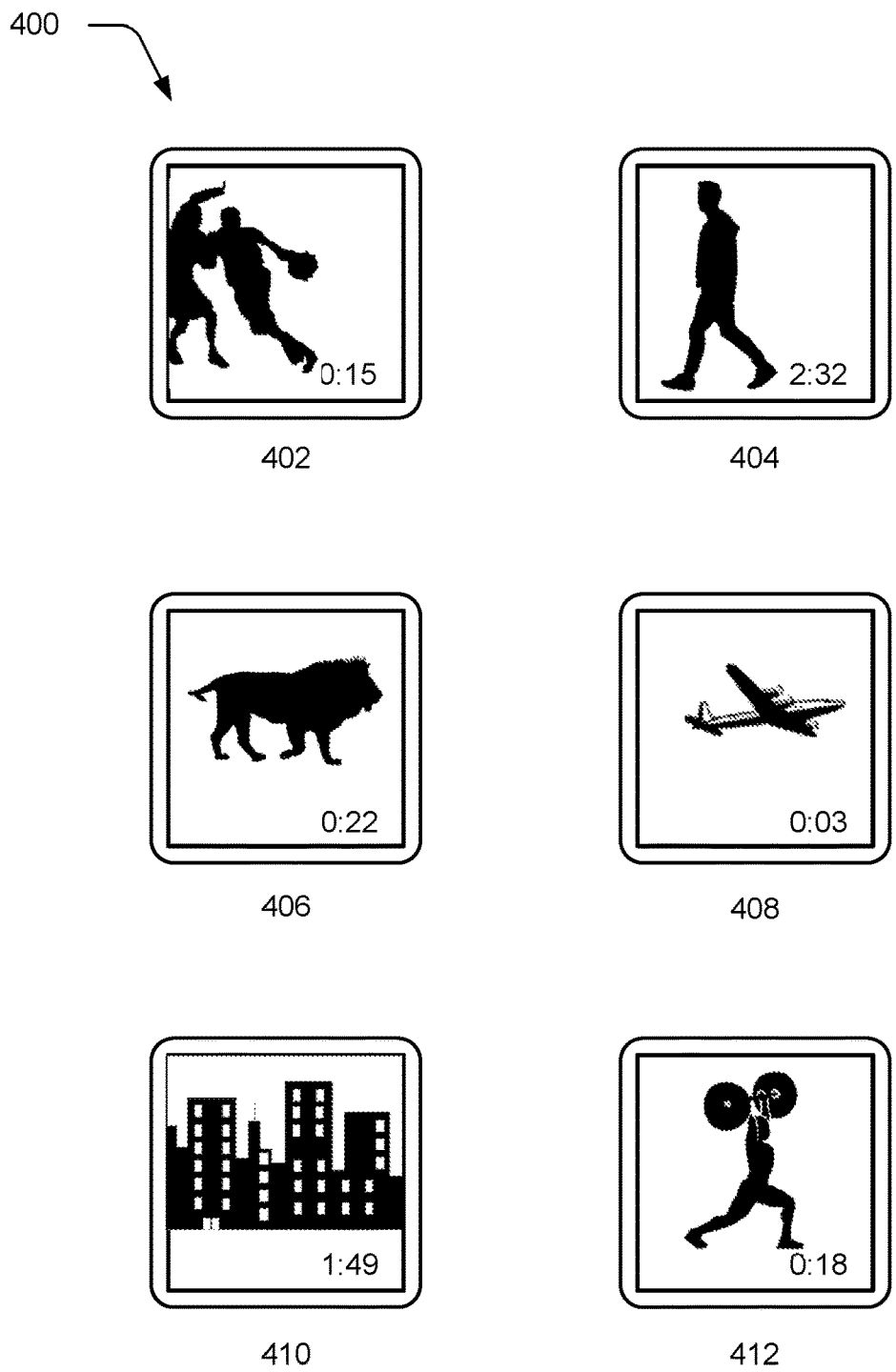
FIG. 4 is a diagram depicting a time duration characteristic that may be used in selecting items of media content for a media collage in accordance with one or more implementations.

Duration of a video may be a characteristic that can be used in determining if the video would be a good fit for inclusion in a media collage. FIG. 4 depicts several videos generally at 400, each having different durations. Each of the videos 402-412 represents videos that may be included in a media collage. It may be desirable for the media collage to have videos that are all similar in length, so that long spans of blank cells within a media collage are avoided. In a collage template having three cells, for instance, videos 402, 406, and 412 may be assigned the highest relevance factors of the six possible video choices 402-412 because videos 402, 406, and 412 are the most similar durations—0:15, 0:22, and 0:18 respectively. The remaining videos, 404, 408, and 410 would be assigned lower relevance factors for the video duration characteristic because the durations of these videos are either much shorter or much longer than the duration of the videos 402, 406, and 412. Further, the videos 404, 408, and 410 do not have similar durations to each other, especially when the duration differences of the videos 404, 408, and 410 are compared to the duration differences of videos 402, 406, and 412.

In one or more implementations, entry or exit animations may be used in a cell either before or after a video is played in a cell of a media collage. Entry and exit animations change how an image, a video, or a pause frame of a video is displayed in some way either at the beginning (entry) or end (exit) of a video in a cell of a media collage. Entry and exit animations may include animations such as a checkerboard, a fly-in, fading in, or a wheel animation, to name a few examples. When used with videos or pause frames of videos, a duration of the animation may be taken into consideration when calculating a relevance factor for video duration.

For example, a relevance factor for video duration may increase if an animation adds time to a video to make the video a similar duration to other videos in a media collage. Alternatively or additionally, a relevance factor may be increased if an animation can be added to the video without increasing the video's duration while at the same time not obfuscating any of the video's desired content. On the other hand, the relevance factor may be decreased if an animation cannot be added to the video without increasing the video's duration and without obscuring some important portion of the video's content. In any case, entry and exit animations can increase a relevance factor for a video if the animations cause the video to have a more similar duration with other videos in a media collage, and can decrease a relevance factor for the video if the animations cause the video to have a less similar duration with other videos in the media collage.

Pause Frame Characteristics

As discussed above, a pause frame is a frame of a video that is selected to remain paused for an amount of time, such as while other videos continue to play in the media collage. In many cases, a pause frame is selected because it is representative of aspects of a video's content. A pause frame may be selected by a user, or may be selected automatically by a computing device. Despite the improved techniques described herein that automatically provide more similar durations of videos in media collages, in some cases the videos appearing in a media collage will not be the same duration. In this case, one or more of the videos in a media collage may experience some time on a pause frame. Therefore, characteristics of a pause frame of a video can be considered as part of creating an aesthetically pleasing media collage.

FIG. 5 depicts two pause frames of different videos generally at 500. First, a relevance factor for a pause frame may be calculated based on a number of detected faces or objects in the pause frame. In one or more implementations, more faces or objects in a pause frame will result in a higher relevance factor. For example, pause frame 502 includes two faces, while pause frame 504 includes only one face. Therefore, pause frame 502 would receive a higher relevance factor than the pause frame 504 in this scenario. While the example of more faces or objects in a pause frame results in a higher relevance factor is described, a higher relevance factor may be received for fewer faces or objects in a pause frame. For instance, some users may find faces and objects in a pause frame distracting from other videos that are playing in the media collage. Therefore, users may wish to have videos with pause frames having lower instances of faces and objects to receive higher relevance factors.

Another relevance factor may be calculated based on the level of quality of the image of the pause frame. In one or more implementations, images used for a pause frame that are higher quality may result in a higher relevance factor. Any metrics may be employed to determine a level of quality of a pause frame, such as lighting, sharpness, contrast, noise, and artifacts, to name a few examples. In the example provided in FIG. 5, pause frame 502 appears to be well lit and sharp when compared to pause frame 504, which appears to be dark and blurry. Therefore, pause frame 502 would receive a higher relevance score in this scenario.

Additionally, an amount of audio near a pause frame may be used to determine a relevance factor for a pause frame. In one or more implementations, a pause frame having no audio at or near the pause frame may result in a high relevance factor, a pause frame having a low volume of audio at or near the pause frame may result in a lower relevance factor, and a pause frame having a high volume of audio at or near the pause frame may result in an even lower relevance factor. Alternatively, pause frames having higher volume of audio at or near the pause frame may result in a higher relevance factor.

Characteristics of Interesting Frames

Interesting frames of a video may be another characteristic that can be used in determining if the video would be a good fit for inclusion in a media collage. Interesting frames are frames that have one or more objects of interest to a user within the frame. For example, faces, objects, or activities may be considered objects of interest to a user. Similarly, multiple faces, multiple objects, or multiple activities captured in a single frame may have more interest to a user than a frame having only a single face, object, or activity. Other properties of frames that may indicate the frame is interesting may include an amount of area a face or faces take up in a frame, whether the camera was zoomed in when the frame was captured, or a velocity of an object within a frame. These are but a few possibilities of properties that may indicate interesting frames, and should not be considered an exhaustive list. Interesting frames may be manually indicated by a user, or may be identified using detection software such as Facial Recognition techniques present in Adobe Lightroom™.

Figure 6:
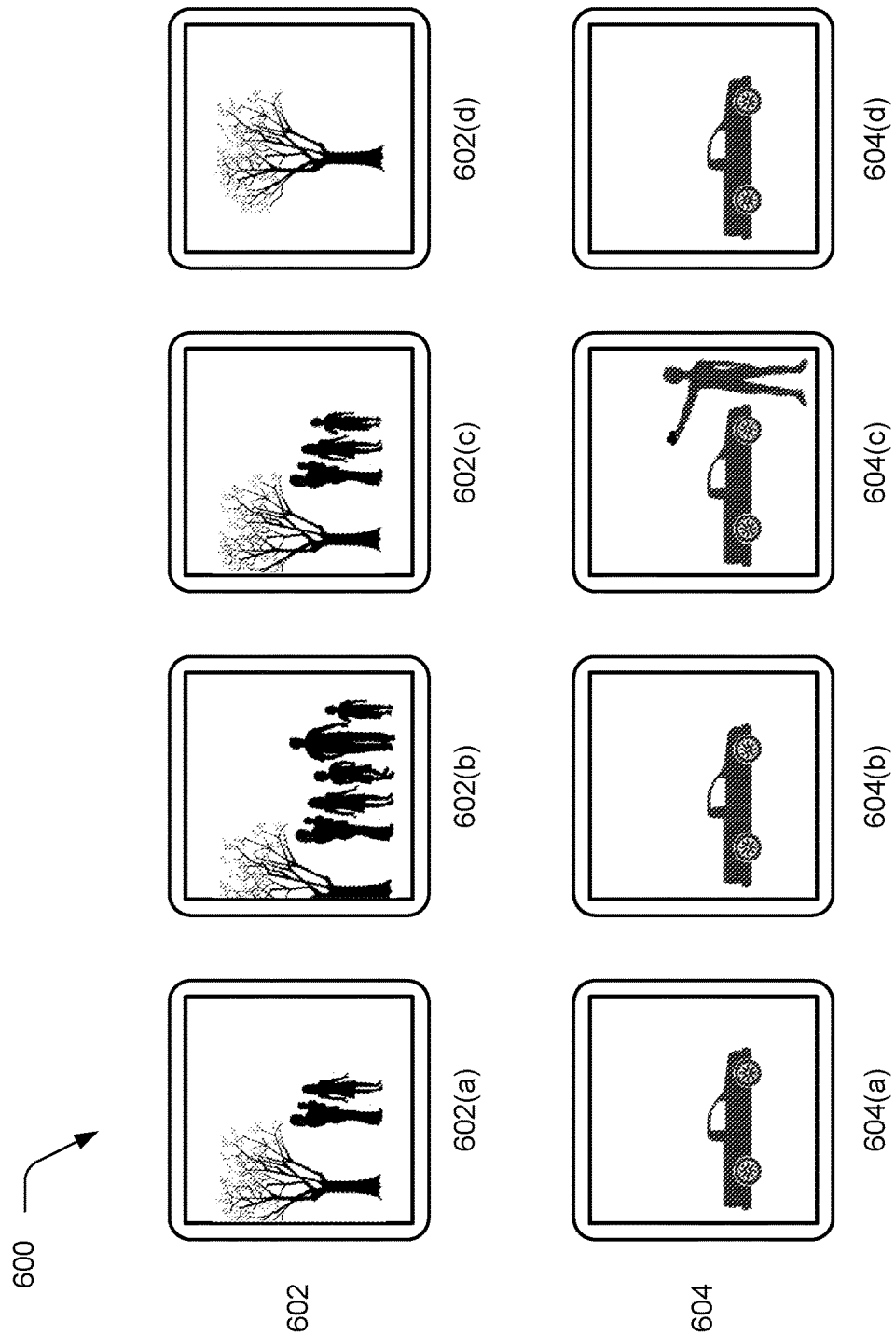
FIG. 6 is a diagram depicting a number of interesting frames characteristic that may be used in selecting items of media content for a media collage in accordance with one or more implementations.

FIG. 6 depicts two videos generally at 600 at points in time throughout the respective videos. A first video 602 is shown at a first point in time 602(*a*), where three people are present in the frame. At a second point in time 602(*b*), six people are present in the frame and at a third point in time 602(*c*) four people are present in the frame. At a fourth point in time 602(*d*), no people are present in the frame. For simplicity, interesting frames are determined in this scenario only by the presence of a person in the frame. Assuming in this case that the frames at these points in time 602(*a*)-(*d*) are representative of the entire first video 602, this would indicate that approximately 75% of the frames of the first video 602 comprise interesting frames.

The second video, 604, shows the frames at each of the points in time 604(*a*)-(*d*) having an object, a truck, within the frame. However, only one frame at the point in time 604(*c*) has a person present in the frame. Assuming in this case that the frames at these points in time 604(*a*)-(*d*) are representative of the entire second video 604, this would indicate that approximately 25% of the frames of the second video 604 comprise interesting frames. Therefore, the second video 604 may result in a lower relevance factor than the first video 602 because it has fewer interesting frames than the first video 602.

While the above scenario only contemplated determination of interesting frames by the presence of a person in the frame, other results may occur if interesting frames are determined using other properties. For example, if the truck in the second video 604 is considered as an object of interest to a user for determining interesting frames, than the second video 604 would comprise 100% interesting frames. Similarly, if the tree in the first video 602 is considered an object of interest to a user for determining interesting frames, than the first video 602 would comprise 100% interesting frames. Because both of the videos 602 and 604 have 100% interesting frames in this example, they may both receive the same relevance factor. On the other hand, if the truck in the second video 604 is moving at a rapid velocity compared to the movement of the people in the first video 602, than the second video 604 may receive a higher relevance factor than the first video 602. In yet another example, the total number of people in the frames of the first video 602 is greater than the total number of people in the frames of the second video 604, which may result in the first video 602 receiving a higher relevance factor than the second video 604.

The above examples describe using a percentage of a video's frames in determining a relevance factor for a video based on interesting frames. However, it should be understood that any metric may be used to compare interesting frames between different videos, such as a fraction of the total number of frames that are interesting frames, or a total number of interesting frames in a video. A total number of interesting frames may be useful when comparing a short video to a longer video, for instance. In such a case, a short video (say, three seconds) may have a much higher percentage of interesting frames than a two minute video because of the shorter video's smaller sample size of frames. However, the longer video may receive a higher relevance factor because the longer video has a higher total number of interesting frames. A threshold number of frames may also be implemented when determining a number of interesting frames in a video to remedy problems that may arise with videos having small numbers of frames, for example.

Media Metadata Characteristics

Oftentimes, items of media content contain metadata that may indicate properties of the particular item of media content. This metadata may include information relating to a copyright, author, keywords, file size, media format, location, or subtitle information, to name a few examples. One way to make use of media metadata in automatically creating media collages is by grouping items of media content having similar metadata characteristics, especially when sequentially combining more than one item of media content in a single cell of a collage template. As an example, consider FIG. 7, which depicts a media collage that is being created generally at 700.

A collage template 702 is shown which has three cells 704, 706, and 708. At this stage of creation of the media collage, two videos have been selected and placed into cells 704 and 706, each having a duration of 1:30. In addition, four videos 710-716 have been selected from among a collection of a user's videos (not pictured) based on metadata associated with each of the videos. In this example, the videos 710-716 have been selected based in part on location metadata associated with each of the videos, which corresponds to the house that is pictured in each of the videos 710-716. Because each of the videos 710-716 has similar location metadata, they have been selected as possible videos from the user's collection of videos for inclusion in the collage template 702.

In order to have an aesthetically pleasing media collage, however, it is desirable to have each cell of the collage template 702 be a similar duration. The videos that have already been placed in cells 704 and 706 both have a duration of 1:30, but none of the videos 710-716 have a duration equal to 1:30. In one or more implementations, multiple videos can be used in the cell 708 of the collage template 702 and played sequentially in order to come closer to the duration of the videos in the cells 704 and 706. In other words, the cumulative time of multiple videos placed in the cell 708 may better match the time of the videos placed in the cells 704 and 706.

A relevance factor may be used to select multiple videos to be placed in the cell 708. The relevance factor may be based on both the location metadata that was used to select the videos 710-716, and how well the cumulative time of multiple videos selected from the videos 710-716 match the duration of the videos in the cells 704 and 706. In this example, the video 710 has a duration of 0:20, the video 712 has a duration of 0:45, and the video 716 has a duration of 0:25, which results in a cumulative duration of 1:30—the same duration as the videos in the cells 704 and 706. Therefore, the videos 710, 712, and 716 would receive a higher relevance factor than a combination of any of the other videos from the options of 710-716. For example, a combination of videos 710 and 714 would have a cumulative duration of 1:35, and therefore would receive a lower relevance factor than the combination of the videos 710, 712, and 716.

The metadata of the videos 710-716 may play an important role in the relevance factor for the videos 710-716. Because the items of media content are being placed in the same cell and displayed sequentially, users may find it important to have items of media content that have properties in common with one another. Metadata provides indicators of how items of media content may be related to one another. While the example herein uses a location as the common property between the videos, any combination of one or more metadata properties between items of media content may be used to tie items of media content together. Related items of media content can then be combined to find a desired total duration that matches with other cells of a collage template.

Figure 7:
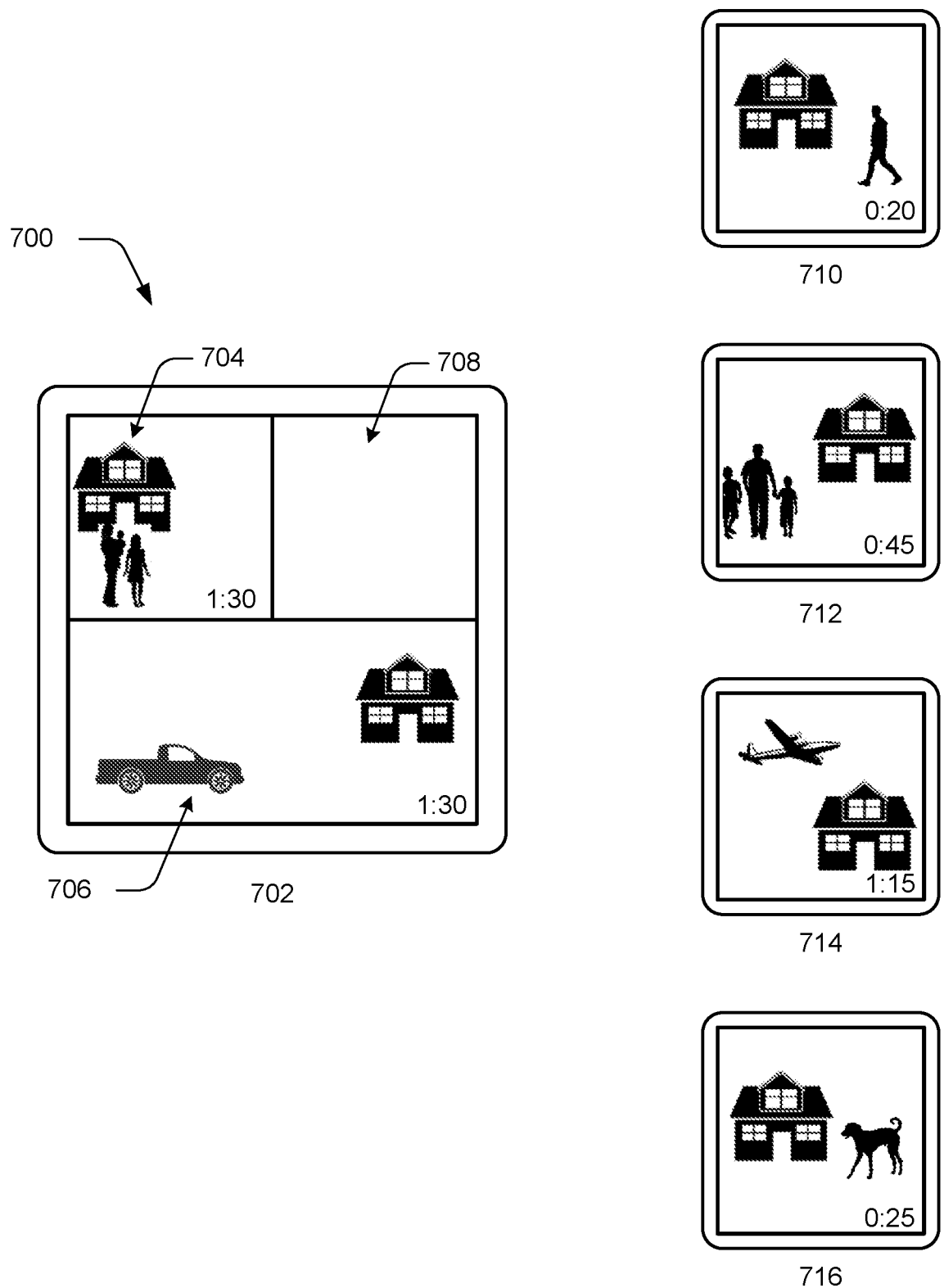
FIG. 7 is a diagram depicting a media metadata characteristic that may be used in selecting items of media content for a media collage in accordance with one or more implementations.

Additionally, while the example provided in FIG. 7 describes videos being selected for a media collage, it should be understood that images may also be used in a similar fashion. For instance, a setting may be applied that causes any image to be displayed in a media collage for five seconds. Images may be combined with one another, or combined with videos, based on the techniques described herein to display in a single cell of a collage template. The images may receive a relevance factor based on metadata associated with the images, along with the image display duration and how the image display duration combines with other items of media content to match durations of items of media content in other cells of the collage template. In general, a better match between metadata of items of media content, and the combined duration of the item of media content with other items of media content to match other cells in a collage template, results in a higher relevance factor.

Characteristics of Aspects Captured in Media

Users may desire for multiple items of media content that are displayed in a media collage to have similar aspects captured in the items of media content. Aspects captured in media content may include objects, people, or places that are captured in items of media content. Aspects captured in media content may be identified by users or may be automatically identified by an application of a computing device, such as Adobe Premiere™ or Adobe Photoshop™.

Figure 8:
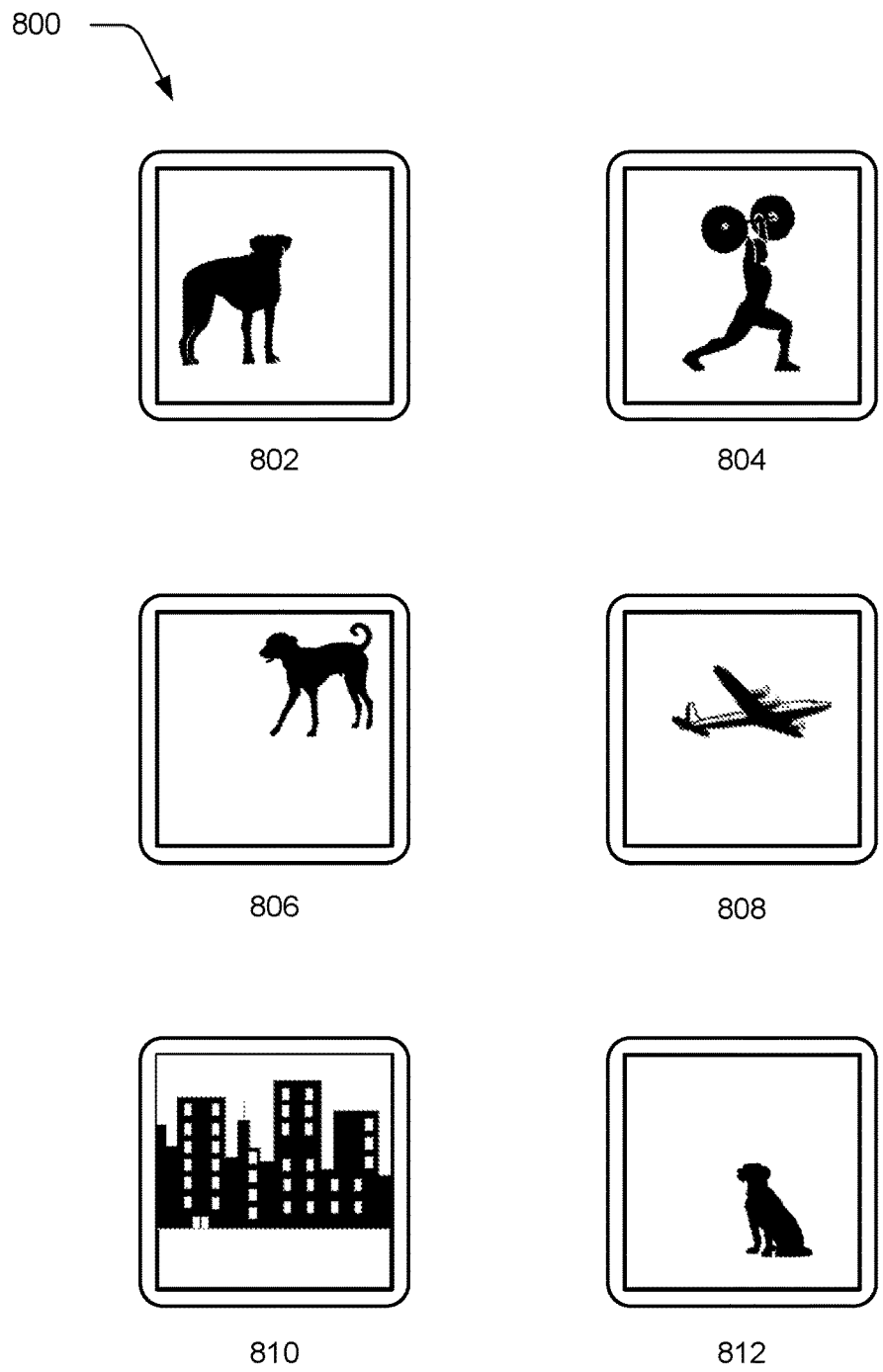
FIG. 8 is a diagram depicting a media aspect characteristic that may be used in selecting items of media content for a media collage in accordance with one or more implementations.

For example, FIG. 8 depicts multiple items of media content that may be considered for selection as part of a media collage, generally at 800. The items of media content 802-812 may each receive a relevance factor based on whether there is a common aspect captured in the items of media content. In this example, the items 802, 806, and 812 each have captured a dog as part of the respective items of media content. On the other hand, the items 804, 808, and 810 have other people, places, or things that have been captured as part of these items of media content. Therefore, the items of media content 802, 806, and 812 would receive a higher relevance factor than the items of media content 804, 808, and 810. The relevance factor may additionally be based on an amount of space an aspect captured in the item of media content takes up, or a duration of time that the aspect captured in the item of media content appears in a video. For instance, aspects taking up a larger portion of space of an item of media content or aspects being present for a longer duration in a video may receive a higher relevance score.

Media Score Calculation

As discussed above and below, relevance factors for items of media content may be combined using a weighted equation or algorithm to generate aesthetically pleasing media collages. In one example, the relevance factors for the characteristics discussed above may be used to generate a media score for an item of media content appearing in a collage template using the following equation:

$$S = \frac{(wm(r1, r2)) * w1 + (wm(r3, r4, r5)) * w2 + r6 * w3 + r7 * w4 + r8 * w5}{w1 + w2 + w3 + w4 + w5}$$

The following table serves as a reference for the variables in the above equation.

| | |
|---|---|
| S | Media score for an item of media content in a collage template |
| wm | Weighted mean of (x1, x2, . . . xN) |
| r1 | Relevance factor for media duration match to other media |
| r2 | Relevance factor for ability to accommodate entry/exit animations to achieve better duration match to other media |
| r3 | Relevance factor for number of detected faces/objects in a pause frame |
| r4 | Relevance factor for level of quality of pause frame image |
| r5 | Relevance factor for audio volume at or near pause frame |
| r6 | Relevance factor for interesting frames |
| r7 | Relevance factor for media metadata used to match combined duration of multiple media content items in a single cell of a template with other cells in the template |
| r8 | Relevance factor for aspects captured in media |
| w1-w5 | Weights |

The weighted means indicated in the above equation may be calculated by applying a weight to each of the relevance factors and then calculating a mean for the combined relevance factors. For example, media duration may be considered more important than whether an item of media content is able to accommodate entry and exit animations. In this example, r1 may then be weighted more heavily than r2 in the weighted mean wm(r1, r2). Similarly, the weights applied to the different characteristics w1-w5 may relate to how important that characteristic is to creating an aesthetically pleasing media collage. In one scenario, having a greater number of interesting frames may be more important than having similar aspects present in the items of content that are selected for a media collage. Therefore, w3 would be given more weight in the equation than w5. The weights used in the equation—including the weights in the weighted means—may be predefined, or may be defined by a user based on characteristics that the user feels are most important to their own media collages.

A media score S is determined for each item of media content as each item of media content appears in a particular collage template. In an example, a media score for each of 10 items of media content in a collage template having two cells will result in (10×9 items of media content)×(2 cells in collage template) or 180 media scores. This is assuming that the same item of media content cannot be placed in a collage template more than once. Once a media score is calculated for each of the items of media content in a first collage template, the generation of media scores for each item of media content is repeated for each possible collage template.

Continuing with the above example, suppose there are two additional possible collage templates that each have three cells. Media scores are found for each of the additional possible collage templates resulting in (10×9×8 items of media content)×(3 cells in collage template) or 2160 media scores for each of the additional possible collage templates. This yields a total of 180+2160+2160 or 4500 total media scores for each of the possible combinations of the 10 items of media content and the three different collage templates. Each of these 4500 media scores is associated not only with the particular item of media content, but also with the collage template in which the item of media content appears, the cell in the collage template in which the item of media content appears, and the combinations of other items of media content appearing in the other cells of the collage template.

Once all of the possible combinations of items of media content and collage templates have been used to generate media scores, template scores are determined for each of the combinations. Template scores are determined by combining the media scores for each item of media content included in a collage template in a particular configuration. In one or more implementations, template scores may be determined by adding the media scores for items of media content in a particular collage template, although other techniques for determining template scores are considered. Continuing again with the above example, template scores may be determined for the collage template having two cells from $T_a = S_1 + S_2$. In this scenario, $S_1$ and $S_2$ are two media scores that were determined for two different items of media content appearing in the two cells of the collage template in a particular configuration. For the collage templates having three cells, template scores may be determined from $T_b = S_3 + S_4 + S_5$, where $S_3$, $S_4$, and $S_5$ are three media scores that were determined for three different items of media content appearing in the three cells of the collage template in a particular configuration.

Once the template scores are determined, one or more collage templates and items of media content are selected based on the template scores to output the media collage. Generating multiple media collages from several of the highest scoring combinations may give a user more options of media collages that the user may like for display or presentation. Once a media collage is output, the user can perform any number of actions with the media collage, such as display in a presentation or on a social media platform.

Having considered techniques for automatic creation of media collages, consider now an example procedure that may be used for automatic creation of media collages in accordance with one or more implementations. The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 9 depicts, generally at 900, a flow diagram for an example procedure for automatic creation of media collages. The procedure depicted in FIG. 9 can be implemented by way of a suitably configured computing device and applications, such as the media content editing application 112 of FIG. 1. The procedure of FIG. 9 can also be implemented by way of other functionality described in relation to FIGS. 1-8 and 10-13. Individual operations and details discussed in relation to FIG. 9 may also be combined in various ways with operations and details discussed herein in relation to the example procedures of FIG. 12.

Media scores are determined for each of a plurality of items of media content based on characteristics of an appearance of each said item within a respective collage template of a plurality of collage templates (block 902). Characteristics of the items of media content may include display duration, pause frame characteristics, characteristics of interesting frames, characteristics indicated in media metadata, and captured aspects in the items of media content, to name some examples. Each of the characteristics of the items of media content may be represented by one or more relevance factors as discussed above. Higher relevance factor values may be used to represent characteristics that are more desirable to incorporate into a media collage.

The media scores may be determined using weights applied to one or more of the relevance factors based on a relative importance of the characteristic represented by a relevance factor in creating the media collage. For example, characteristics that are more important may receive a higher weight applied to the relevance factor when determining the media score. Each item of media content may receive a media score for each cell in each possible collage template with each combination of other items of media content in the collage templates. Alternatively or additionally, subsets of items of media content and/or collage templates may be selected for score calculation. In an example, a user may want to generate a media collage only comprising items of media content from a folder titled "Remi's Second Birthday" and have four cells in the media collage. Therefore, determining media scores would only take place for this subset of items of media content and collage template options, rather than the user's entire media content library and all collage template options.

A template score is then determined for each collage template of the plurality of collage templates by combining the media scores for each media item of the plurality of media items included in the respective said collage template (block 904). In other words, every collage template receives a template score for every combination of items of media content that are possible within each collage template. In one or more implementations, the template scores are only calculated for combinations that do not repeat a same item of media content in a collage template. Again consider the example above with ten items of media content, one collage template having two cells, and two collage templates having three cells. When items of media content are not repeated within a collage template, this results in (10×9 items of media content)×(2 cells in collage template) or 180 media scores for the two-cell collage template, and (10×9×8 items of media content)×(3 cells in collage template) or 2160 media scores for each of the three-cell collage templates. This yields a total of 180+2160+2160 or 4500 total media scores for each of the possible combinations of the 10 items of media content and the three different collage templates.

Next, at least one of the plurality of collage templates is selected based on the determined template scores for the plurality of collage templates (block 906), and a media collage is output based on the selected at least one of the plurality of collage templates (block 908). The collage templates may be selected and output based on which of the plurality of collage templates and combination of items of media content resulted in the highest template scores, for example. Selecting more than one combinations of items of media content in and collage templates may give users options to choose which media collage they like best from several aesthetically-pleasing options.

Having considered systems and techniques for implementation of automatic creation of media collages, consider now techniques for removal of unwanted frames from items of media content in accordance with one or more implementations.

Removing Unwanted Frames from Items of Media Content

As discussed above, the techniques described herein may be used to remove unwanted frames from items of media content, such as video. Frames may be considered "unwanted" when the frames do not comprise any content that a user desires to keep—for example, black frames without any audio component. Unwanted frames present problems because they take up storage space as part of a video that could otherwise be used to store additional items of media content or data. Further, unwanted frames detract from presentation of a video. Current processes to remove unwanted frames typically check each pixel of every frame to determine if the frame is a uniform color, such as black. Checking each pixel of every frame is time consuming, even by a computing device. Further, checking each pixel of every frame uses a great deal of processing power and thus rapidly drains batteries of computing devices employed with removing unwanted frames.

Figure 10:
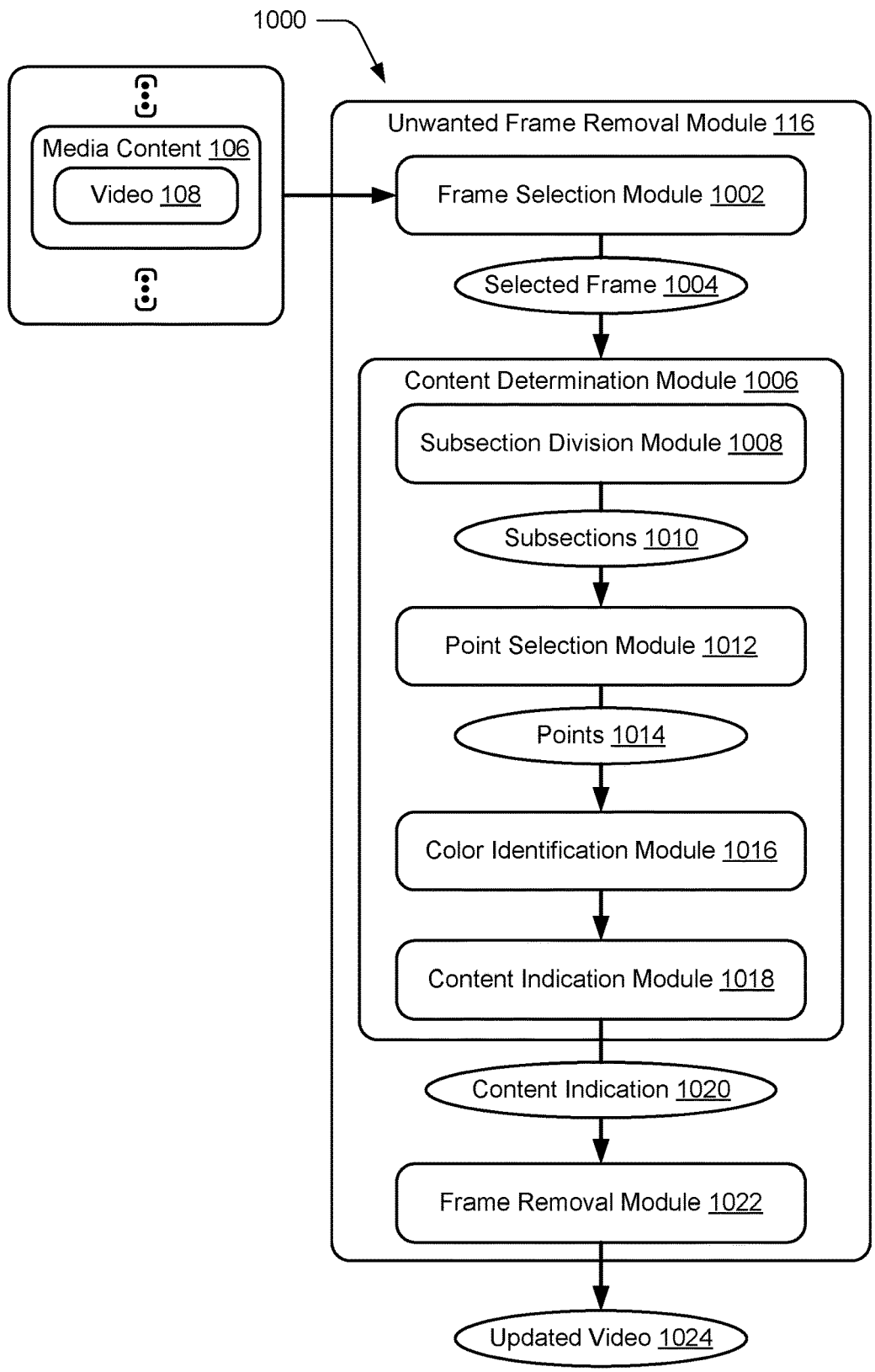
FIG. 10 illustrates additional details of an unwanted frame removal module in accordance with one or more implementations.

FIG. 10 depicts the unwanted frame removal module 116 of FIG. 1 in greater detail at 1000, which is configured to detect and remove unwanted frames from an item of media content more efficiently than with previous techniques. The unwanted frame removal module 116 includes a frame selection module 1002, which may receive as an input an item of media content 106 having a plurality of frames, such as a video 108. The frame selection module 1002 selects a frame 1004 from the plurality of frames for further determination of whether there is desired content in the particular frame. The selected frame 1004 may be chosen by first determining that a particular frame of the video is a generally uniform color by checking the color of each pixel of the particular frame. If the particular frame is determined to be the generally uniform color, then a number of frames may be skipped to arrive at a later frame, and that later frame is selected to be the selected frame 1004.

The selected frame 1004 is sent to a content determination module 1006, which is configured to determine a likelihood that the selected frame 1004 has associated content that is of interest to a user. Generally, if the selected frame 1004 has content that is of interest to a user, then the selected frame 1004 is not an unwanted frame. Further, because unwanted frames are considered herein to be a generally uniform color, then frames that are generally a uniform color are not considered to be of interest to a user.

To determine a likelihood that the selected frame 1004 is of interest to the user, the content determination module 1006 includes a subsection division module 1008 to divide the selected frame 1004 into a plurality of subsections 1010. Next, a point selection module 1012 selects a plurality of points 1014, where each point is included in a respective subsection of the plurality of subsections 1010. A location of each point of the plurality of points 1014 may be selected at random within each subsection, or there may be a preset determination for the locations of the plurality of points 1014 within each of the subsections.

Once the plurality of points 1014 are selected, a color identification module 1016 identifies whether the selected plurality of points 1014 have a generally uniform color, one to another. In one or more implementations, the generally uniform color of the selected points 1014 may be the same generally uniform color that was used by the frame selection module 1002 to choose the selected frame 1004. Based on the identification of the colors of the plurality of points 1014, a content indication module 1018 generates a content indication 1020 of the likelihood that the selected frame 1004 has associated content that is of interest to the user. For example, if the identified colors of the plurality of points 1014 are generally uniform, then the content indication 1020 may indicate that the selected frame 1004 is unlikely to be of interest to the user. On the other hand, if the identified colors of the plurality of points 1014 are not generally uniform, then the content indication 1020 may indicate that the selected frame 1004 is likely to be of interest to the user.

Based on the content indication 1020, a frame removal module 1022 manages removal of frames from the video 108. For instance, consider the scenario in which the content indication 1020 indicates that the selected frame 1004 is likely to be of interest to the user. The frame removal module 1022 may evaluate each pixel of every frame that was skipped in choosing the selected frame 1004 to determine which of the skipped frames are comprised of the generally uniform color. The frame removal module 1022 may then remove the unwanted frames that are comprised generally of the uniform color. Once the unwanted frames are removed from the video 108, an updated video 1024 is output that does not comprise the unwanted frames.

However, the content indication 1020 may indicate that the selected frame 1004 is unlikely to be of interest to the user. In this case, the unwanted frame removal module 116 may repeat selecting a frame of the video 108 and determining a likelihood that the selected frame has associated content that is of interest to the user until a selected frame is located that is likely to have associated content that is of interest to the user. When a selected frame is located that is likely to have associated content that is of interest to the user, the frame removal module 1022 may evaluate each pixel of every frame that was skipped to determine which of the skipped frames are comprised of the generally uniform color, and remove any of the frames that are comprised of the generally uniform color.

Figure 11:
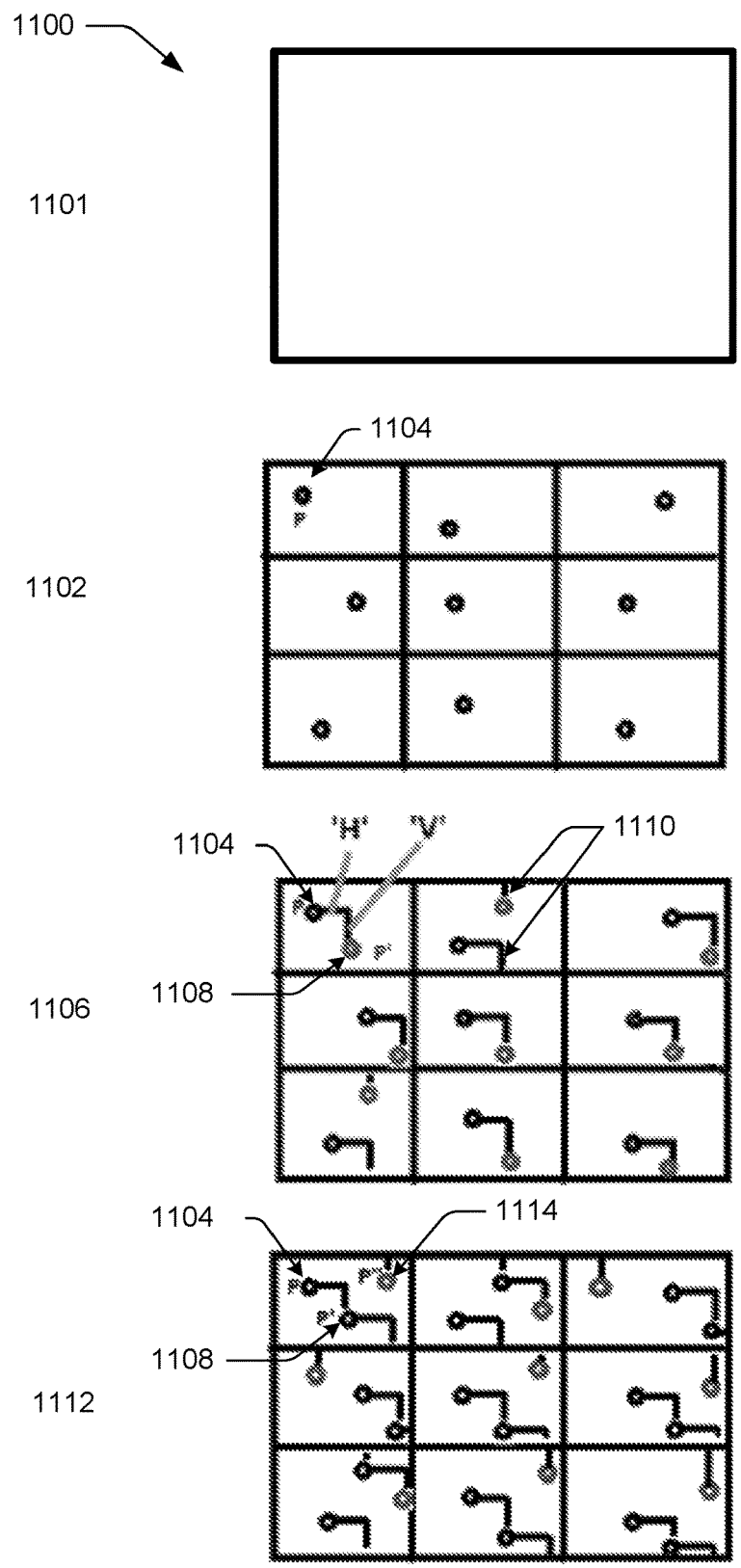
FIG. 11 is a diagram depicting how unwanted frames may be identified within an item of media content in accordance with one or more implementations.

FIG. 11 depicts additional details of a process for removing unwanted frames from an item of media content, in this case a video, generally at 1100. Three different frames of the video are depicted at 1101, 1102, 1106, and 1112, respectively. In the first frame of the video 1101, a first check is made to determine if the frame is entirely a uniform color, such as black (although white is pictured, for clarity). The first check to determine if the first frame 1101 is the uniform color can be done by examining multiple pixels in the frame and evaluating the color of each of the multiple pixels. In one or more implementations, the first check may check every pixel of the first frame 1101, or may check fewer than all of the pixels of the first frame 1101. If the first frame 1101 is not a uniform color, than the process may end as there may be no unwanted frames in the video. Alternatively, if the first frame 1101 is not a uniform color than another frame may be selected as the first frame for the process at a different location within the video.

However, if the first frame 1101 is a uniform color, then a number of frames 'S' of the video are skipped to arrive at a second frame of the video 1102. In one example, 'S' is 10 frames that are skipped between the first frame 1101 and the second frame 1102, although any suitable number of frames may be skipped. The second frame is then divided into a number of subsections. Three subsections are pictured, but any number of subsections are contemplated. Within each of the subsections of the second frame 1102, a point 1104 is selected for evaluation of the point's color. The point 1104 may comprise one or more pixels of the subsection in which the point is located. The location of the point 1104 may be selected at random within each subsection, or may be selected according to predefined criteria. After the points are selected for each subsection in the second frame 1102, the color of the points are evaluated. If any of the points in the second frame 1102 are not a uniform color, than the second frame 1102 is not entirely comprised of the uniform color, and the process continues by checking all (or multiple) pixels of each frame between the first frame 1101 and the second frame 1102. Each frame between the first frame 1101 and the second frame 1102 can be checked to determine the exact location in the video at which frames are no longer comprised entirely of the uniform color. Frames comprised entirely of the uniform color are removed from the video.

Otherwise, if all of the points of the second frame 1102 are the uniform color, than 'S' frames are again skipped to arrive at a third frame 1106 in the video. The third frame 1106 is also divided into subsections as was the case in the second frame 1102. In the third frame 1106, however, the location of the point 1104 is incremented to point 1108. In one or more implementations, the horizontal 'H' and vertical 'V' distance from the point 1104 to the point 1108 is less than the width and height of each of the subsections of the frames 1101 and 1102. In some instances, incrementing the location of a point may cause the location of the point to exceed the boundaries of a subsection. In this case, the amount of 'H' or 'V' that exceeds the boundary of the subsection can carry on from the opposite side of the subsection. To illustrate, the 'V' or vertical component 1110 is interrupted by the bottom boundary of the particular subsection, and 'V' is therefore continued beginning at the top of the same subsection.

Similar to the discussion of the second frame 1102, each of the points—at the incremented locations—is evaluated to determine color of the points in the third frame 1106. If any of the points in the third frame 1106 are not a uniform color, than the third frame 1106 is not entirely comprised of the uniform color, and the process continues by checking all (or multiple) pixels of each frame between the first frame 1101 and the third frame 1106. Each frame between the first frame 1101 and the third frame 1106 can be checked to determine the exact location in the video at which frames are no longer comprised entirely of the uniform color. Frames comprised entirely of the uniform color are removed from the video.

Otherwise, if all of the points of the third frame 1106 are the uniform color, than 'S' frames are again skipped to arrive at a fourth frame 1112 in the video. The fourth frame 1112 is also divided into subsections as was the case in the second frame 1102 and the third frame 1106. The location of the point 1108 is incremented to point 1114. In the fourth frame 1112, the vertical 'V' portion when the point 1108 is incremented to the point 1114 has been interrupted by the bottom boundary of the subsection, and therefore has continued from the top of the subsection as discussed above. Each of the points at the incremented locations is evaluated to determine color of the points in the fourth frame 1112. If any of the points in the fourth frame 1112 are not a uniform color, than the fourth frame 1112 is not entirely comprised of the uniform color, and the process continues by checking all (or multiple) pixels of each frame between the first frame 1101 and the fourth frame 1112. Each frame between the first frame 1101 and the fourth frame 1112 can be checked to determine the exact location in the video at which frames are no longer comprised entirely of the uniform color. Frames comprised entirely of the uniform color are removed from the video.

However if all of the points of the fourth frame 1112 are the uniform color, than the process continues skipping 'S' frames, incrementing the locations of the points, and evaluating the colors of the incremented points until a point is found that is not the uniform color. Once a frame is found that contains a point that is not the uniform color, each frame between the first frame 1101 and the frame containing the point that is not the uniform color are evaluated by checking all (or multiple) pixels of each frame between the first frame 1101 and the frame containing the point that is not the uniform color. Each frame between the first frame 1101 and the frame containing the point that is not the uniform color can be checked to determine the exact location in the video at which frames are no longer comprised entirely of the uniform color. Frames comprised entirely of the uniform color are removed from the video.

In one or more implementations, a validation procedure may be implemented systematically throughout the process 1100 described in relation to FIG. 11. The validation procedure may cause particular frames to have multiple pixels evaluated to determine if the particular frames are entirely the uniform color. The validation procedure may evaluate all of the pixels of the particular frames or more pixels than would be evaluated using the points in the subsections described above. If 'S' is the number of frames to be skipped in the procedure described above, a number of frames 'K' may be selected as the number of frames to skip between implementing the validation procedure. Every frame that is a multiple of 'K' can have the color of every pixel (or multiple pixels) evaluated rather than having the process 1100 applied. If any of the pixels are determined not be the uniform color, than each of the frames between the first frame and the frame that underwent the validation procedure is checked as described above. Otherwise, 'S' frames are skipped, and the process 1100 continues as described above. The validation procedure may override the process 1100 for a particular frame if the particular frame is a multiple of 'K'; otherwise, the process 1100 is executed for every frame that is a multiple of 'S.' In one or more implementations, 'K' is greater than 'S.'

In an example of the validation procedure, take 'S' to be 10 frames and 'K' to be 300 frames. Assuming that the selected points that are checked in each of the subsections continue to all be the uniform color, the process 1100 will be applied to frame 10, frame 20, frame 30, frame 40, and so on of a video. However, when frame 300 is reached, the validation procedure is applied to check all pixels in frame 300, rather than applying the process 1100 to only check the selected points in each of the subsections of the frame. If frame 300 is entirely the uniform color, then frames 310, 320, 330, and so on are checked using the process 1100. When frame 600 is reached, the validation procedure is applied once again, continuing with this sequence until a frame is discovered that is not entirely the uniform color.

Figure 12:
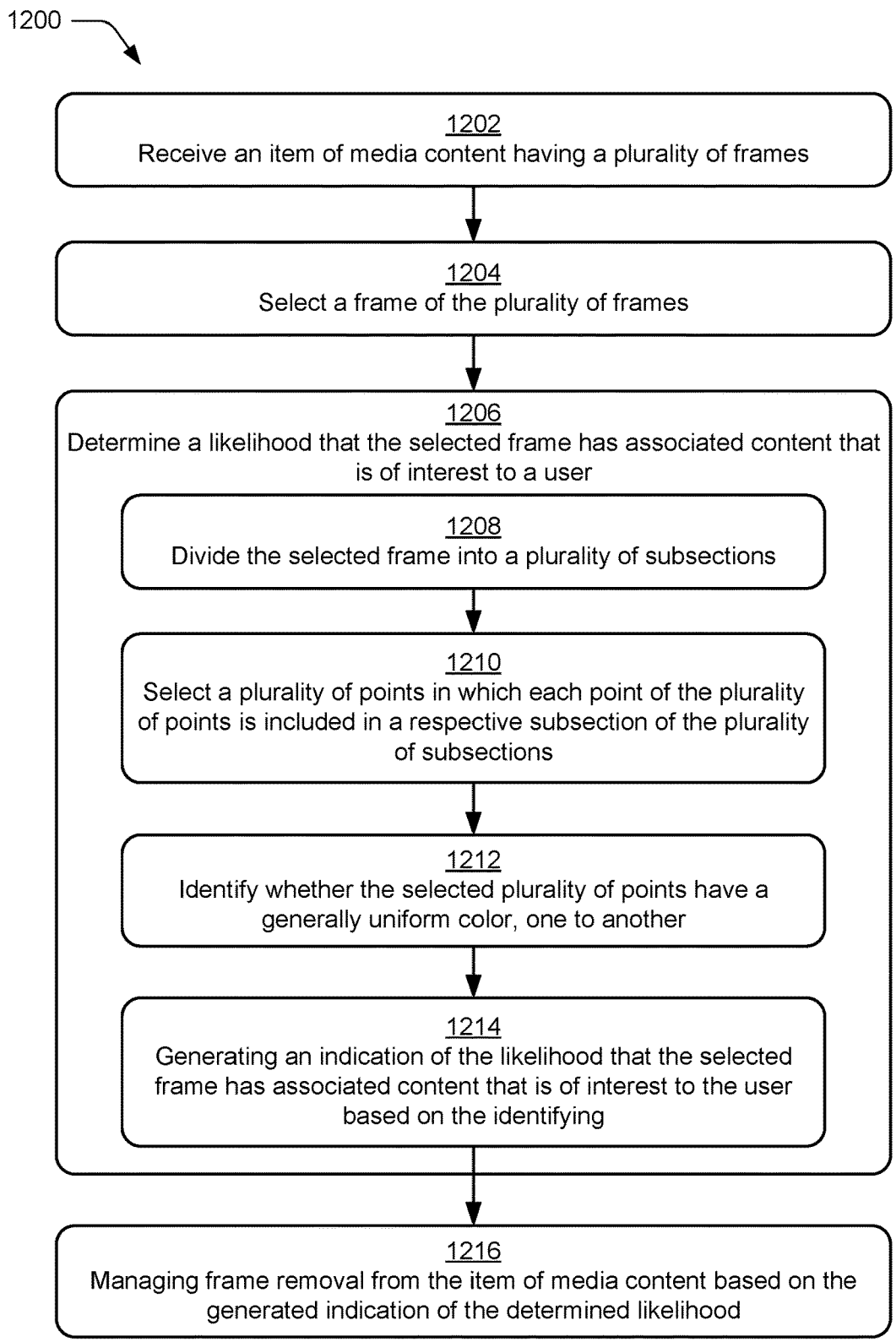
FIG. 12 is a flow diagram that describes details in an example procedure which includes identification and removal of unwanted frames from items of media content in accordance with one or more implementations.

FIG. 12 depicts, generally at 1200, a flow diagram for an example procedure for removing unwanted frames from items of media content. The procedure depicted in FIG. 12 can be implemented by way of a suitably configured computing device and applications, such as the media content editing application 112 of FIG. 1. The procedure of FIG. 12 can also be implemented by way of other functionality described in relation to FIGS. 1-11 and 13. Individual operations and details discussed in relation to FIG. 12 may also be combined in various ways with operations and details discussed herein in relation to the example procedures of FIG. 9.

An item of media content is received having a plurality of frames (block 1202), and a frame of the plurality of frames is selected (block 1204). The frame that is selected may not necessarily be the first-occurring frame in the item of media content, but may occur at any point in the duration of the item of media content. In one or more implementations, the frame is selected by a process that first identifies whether a particular frame of the item of media content is comprised of a generally uniform color. A threshold amount of variance may be accepted between colors of pixels of the particular frame in determining if the first frame is a generally uniform color. If the particular frame is a generally uniform color, than a number of frames may be skipped. The frame that is arrived upon following the skipped frames may be chosen as the selected frame.

Next, a likelihood that the selected frame has associated content that is of interest to a user is determined (block 1206). In one or more implementations, determining whether a frame has content that is of interest to a user may comprise determining whether the selected frame is a generally uniform color, and/or determining whether there is an audio component at or near the selected frame. As discussed above, previous techniques that checked each pixel of every frame to determine whether the frames were a generally uniform color were time consuming and used large amounts of processing resources.

To alleviate problems with previous techniques, the selected frame is divided into a plurality of subsections (block 1208). The selected frame may be divided into 4×4 or 16 total subsections, for example, although any suitable number of subsections may be used. The number of subsections may vary based on a size or shape of the item of media content, for instance. When the selected frame is divided into subsections, a plurality of points are selected in which each point of the plurality of points is included in a respective subsection of the plurality of subsections (block 1210). The points that are selected in each of the subsections may be randomly located, or there may be some predetermined basis for selecting the point in each of the subsections. The location of the point in each of the subsections may each be different relative to the other subsections, or may be the same location within each of the subsections. The selected points may be any suitable size, such as one pixel or several pixels.

Once the points are selected, colors of the selected plurality of points are identified to determine whether the points have a generally uniform color (block 1212). Again, a threshold amount of variance may be accepted between colors of the points in determining if the first frame is a generally uniform color. Then, an indication of the likelihood that the selected frame has associated content that is of interest to the user is generated based on the identifying (block 1214). For example, if the plurality of points are determined to be a generally uniform color, then the indication may specify that the selected frame is not likely to have associated content that is of interest to the user. Alternatively, if the plurality of points are determined to not be a generally uniform color, then the indication may specify that the selected frame is likely to have associated content that is of interest to the user.

If the selected points are all determined to be the uniform color, then an additional number of frames may be skipped to select at an additional frame to determine if the additional frame has associated content that is of interest to the user. After arriving at the additional frame, a location of the selected plurality of points within each of the subsections can be incremented. Again, a determination is made as to whether any of the selected points are the generally uniform color, this time at the incremented locations. As discussed above, the location of the selected points may be incremented in both a horizontal direction and a vertical direction, or incremented in one of a horizontal direction or a vertical direction. The distance that the location of the selected points is incremented may be less than a height or width of a subsection that contains the selected point. However, in some cases the distance that a point is to be incremented may extend beyond a boundary of the subsection that contains the selected point. In this case, the remainder of the distance that the point is to be incremented extending beyond the boundary of the subsection may be continued, in a wrap-around fashion, from the opposite side of the same subsection. Once again, a threshold amount of variance may be accepted between colors of the selected points at the incremented locations in determining if the selected points at the incremented locations are all a generally uniform color.

The skipping additional numbers of frames, incrementing the locations of the selected points, and determining whether any of the selected points are a generally uniform color may be repeated until a selected point is found that is not the uniform color. In addition, as discussed above, a validation procedure may be used at predetermined intervals throughout the repeating of these steps. The validation procedure may comprise checking a greater area of a frame for the uniform color than the area that would otherwise be checked at the selected points, such as checking the entire frame to determine if the entire frame is the uniform color. Further, the validation procedure may occur at a greater number of skipped frames than the number of frames that are skipped when checking the color of the selected points. For example, if ten frames are skipped between incrementing the locations of the selected points and identifying whether the selected points have a generally uniform color, than the validation procedure may occur every 300 frames in place of the identifying.

Frame removal from the item of media content is managed based on the generated indication of the determined likelihood (block 1216). If at any time, any of the selected points are determined to not be the uniform color, then multiple frames that were skipped may be checked to determine which of the multiple frames that were skipped are the generally uniform color. In one or more implementations, each skipped frame is checked to determine if all of the skipped frames are the generally uniform color. Additionally, checking each skipped frame may include checking each pixel of the skipped frames, or may include checking fewer than all the pixels of the skipped frames. If fewer than all of the pixels of the skipped frames are checked, than the area of the frames that are checked may be greater than the total area of the selected points described above. Frames that are comprised of the generally uniform color are removed from the item of media content, as these frames are unlikely to have associated content that is of interest to the user.

The example procedure 1200 yields an item of media content with unwanted frames removed accurately, more efficiently, and using less processing power than existing techniques, as the number of frames to have every pixel checked for a uniform color is greatly reduced.

Example System

Figure 13:
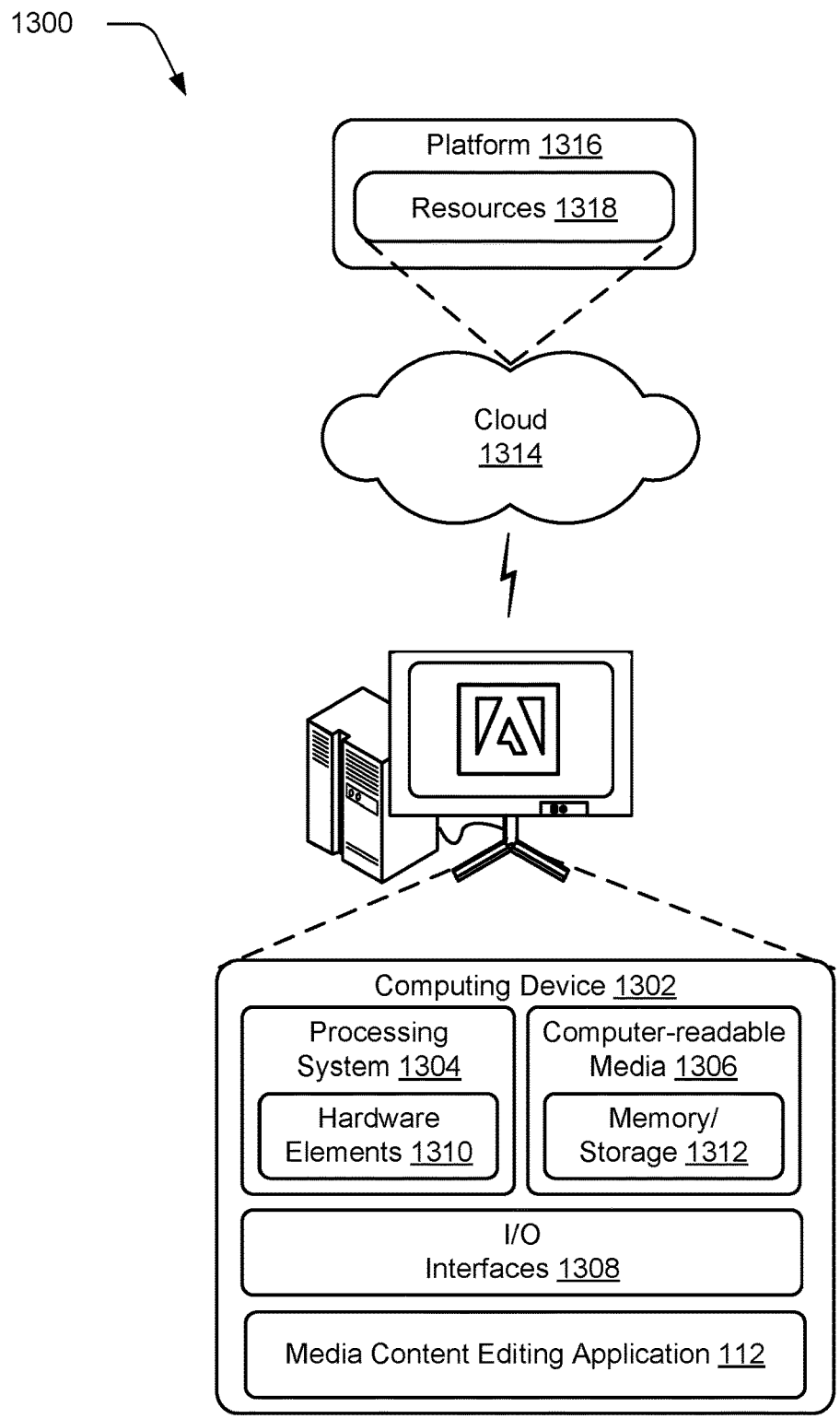
FIG. 13 is a block diagram of a system that can include or make use of automatic creation of media collages in accordance with one or more implementations.

FIG. 13 illustrates generally at 1300 an example system that includes an example computing device 1302 that is representative of one or more computing systems and/or devices that may implement the various techniques described herein. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1302, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the storage 104, collage creation module 114, unwanted frame removal module 116, collage display module 118, and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules as a module that is executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system of FIG. 13, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer, mobile, and camera uses. Each of these configurations includes devices that may have generally different constructs and capabilities, and thus the computing device 1302 may be configured according to one or more of the different device classes. For instance, the computing device 1302 may be implemented as the computer class of a device that includes a personal computer, desktop computer, a multi-screen computer, laptop computer, netbook, and so on. The computing device 1302 may also be implemented as the mobile class of device that includes mobile devices, such as a mobile phone, portable music player, portable gaming device, a tablet computer, a multi-screen computer, and so on.

The techniques described herein may be supported by these various configurations of the computing device 1302 and are not limited to the specific examples of the techniques described herein. This is illustrated through inclusion of the storage 104 and media content editing application 112 on the computing device 1302. The functionality represented by the storage 104 and media content editing application 112 and other modules/applications may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system of FIG. 13. For example, the functionality may be implemented in part on the computing device 1302 as well as via the platform 1316 that abstracts the functionality of the cloud 1314.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

The invention claimed is:

1. In a digital media environment for generating a media collage, a method implemented by at least one computing device, the method comprising:
determining, by the at least one computing device, media scores for each item of a plurality of items of media content, the media scores based on numeric relevance factors that represent characteristics of an appearance of each said item within a respective collage template of a plurality of collage templates, the items of media content including videos, and the characteristics of the appearance including at least a duration of each of the videos, wherein assignment of a respective relevance factor to a respective video is based on how similar the duration of the video is to a respective duration of each of the other videos of the plurality of items of media content;
determining, by the at least one computing device, a template score for each collage template of the plurality of collage templates by combining the media scores for each item of the plurality of items included in the respective said collage template;
selecting, by the at least one computing device, at least one of the plurality of collage templates based on the determined template scores; and
outputting, by the at least computing device, the media collage based on the selected at least one of the plurality of collage templates.

2. The method of claim 1, wherein the characteristics of the appearance further include an aspect shared between the items of media content.

3. The method of claim 1, wherein the determining the media scores for the plurality of items of media content further comprises computing a weighted mean of two or more of the relevance factors.

4. The method of claim 1, wherein the characteristics of the appearance further include a number of objects or faces detected in a pause frame of the item of media content.

5. The method of claim 1, wherein the assignment of the respective relevance factor is further based on a number of objects or faces detected in a pause frame of the respective video.

6. The method of claim 1, wherein the assignment of the respective relevance factor is further based on a number of interesting frames in the respective item of media content.

7. The method of claim 1, wherein the plurality of items of media content are a subset of a larger collection of items of media content, and wherein the plurality of collage templates are a subset of a larger collection of collage templates.

8. The method of claim 1, further comprising removing, automatically by the at least one computing device, unwanted frames from the videos of the items of media content before the determining of the media scores.

9. The method of claim 1, wherein the plurality of items of media content further include images.

10. The method of claim 1, wherein the characteristics of the appearance further include a determined level of quality of pause frames of the items of media content.

11. In a digital media environment for generating media collages comprising multiple media content items, a computing device comprising:
means for determining media scores for a plurality of items of media content based on numeric relevance factors that represent characteristics of an appearance of each of the items of media content in a plurality of collage templates, the items of media content including videos, and the characteristics of the appearance including at least a duration of each of the videos, wherein assignment of a respective relevance factor to a respective video is based on how similar the duration of the video is to a respective duration of each of the other videos of the plurality of items of media content;
means for determining template scores for the plurality of collage templates by combining the media scores of particular items of media content of the plurality of items of media content as the particular items of media content appear in the plurality of collage templates;
means for selecting one or more of the plurality of collage templates including one or more combinations of items of media content based on the template scores; and
means for outputting the media collage based on the selected at least one of the plurality of collage templates and the plurality of items of media content.

12. The computing device of claim 11, wherein the characteristics of the appearance further include an aspect shared between the items of media content.

13. The computing device of claim 12, wherein the numeric relevance factors represent the characteristics in an algorithm that weights the numeric relevance factors in accordance with a relative importance of the characteristics represented by the numeric relevance factors.

14. One or more computer-readable storage media comprising instructions stored thereon that, responsive to execution by a computing device, causes the computing device to perform operations comprising:
   determining media scores for each item of a plurality of items of media content, the media scores based on numeric relevance factors that represent characteristics of an appearance of each said item within a respective collage template of a plurality of collage templates, the items of media content including videos, and the characteristics of the appearance including at least a duration of each of the videos, wherein assignment of a respective relevance factor to a respective video is based on how similar the duration of the video is to a respective duration of each of the other videos of the plurality of items of media content;
   determining a template score for each collage template of the plurality of collage templates by combining the media scores for each item of the plurality of items included in the respective said collage template;
   selecting at least one of the plurality of collage templates based on the determined template scores; and
   outputting the media collage based on the selected at least one of the plurality of collage templates.

15. The one or more computer-readable storage media of claim 14, wherein the characteristics of the appearance further include:
   a number of objects or faces detected in pause frames of the items of media content;
   a determined level of quality of the pause frames of the items of media content;
   a number of interesting frames in the items of media content, the interesting frames comprising at least one face or object;
   a duration of a subset of the items of media content that are to be displayed sequentially in a single cell of a particular collage template of the plurality of collage templates, the subset of the items of media content determined based on metadata shared between the items of media content in the subset; and
   an aspect shared between the items of media content.

16. The one or more computer-readable storage media of claim 15, wherein the determining the media scores for the plurality of items of media content further comprises computing a weighted mean of two or more of the relevance factors.

17. The one or more computer-readable storage media of claim 15, wherein the determining the media scores for the plurality of items of media content further comprises applying weights to the relevance factors based on a relative importance of each of the characteristics, one to another.

18. The one or more computer-readable storage media of claim 14, wherein the characteristics of the appearance further include a number of objects or faces detected in a pause frame of the item of media content.

19. The one or more computer-readable storage media of claim 14, wherein the assignment of the respective relevance factor is further based on a number of objects or faces detected in a pause frame of the respective video.

20. The one or more computer-readable storage media of claim 14, wherein the assignment of the respective relevance factor is further based on a number of interesting frames in the respective item of media content.

* * * * *